(12) United States Patent
Asakawa

(10) Patent No.: US 12,281,232 B2
(45) Date of Patent: Apr. 22, 2025

(54) TREATMENT LIQUID AND RECORDING METHOD

(71) Applicant: SEIKO EPSON CORPORATION, Tokyo (JP)

(72) Inventor: Yuta Asakawa, Azumino (JP)

(73) Assignee: SEIKO EPSON CORPORATION (JP)

( * ) Notice: Subject to any disclaimer, the term of this patent is extended or adjusted under 35 U.S.C. 154(b) by 187 days.

(21) Appl. No.: 17/980,964

(22) Filed: Nov. 4, 2022

(65) Prior Publication Data

US 2023/0145299 A1 May 11, 2023

(30) Foreign Application Priority Data

Nov. 5, 2021 (JP) .................. 2021-180991

(51) Int. Cl.
*B41J 2/175* (2006.01)
*B41J 11/00* (2006.01)
*B41M 7/00* (2006.01)
*C09D 11/54* (2014.01)

(52) U.S. Cl.
CPC ........... *C09D 11/54* (2013.01); *B41M 7/0018* (2013.01)

(58) Field of Classification Search
CPC ....... C09D 11/54; B41M 7/0018; B41J 2/175; B41J 11/002
See application file for complete search history.

(56) References Cited

U.S. PATENT DOCUMENTS

| 2011/0310166 A1* | 12/2011 | Namba | ................. | B41J 2/17553 |
| | | | | 206/524.1 |
| 2013/0070036 A1* | 3/2013 | Ooishi | .................... | C09D 11/54 |
| | | | | 347/102 |
| 2015/0274992 A1* | 10/2015 | Aoyama | ................. | C09D 11/38 |
| | | | | 347/21 |
| 2021/0170779 A1 | 6/2021 | Asakawa et al. | | |

FOREIGN PATENT DOCUMENTS

JP 2021-091142 A 6/2021

* cited by examiner

*Primary Examiner* — Jason S Uhlenhake
(74) *Attorney, Agent, or Firm* — Harness, Dickey & Pierce, P.L.C.

(57) ABSTRACT

A treatment liquid is a water-based treatment liquid and is used for a recording method of adhering a water-based ink jet ink composition containing a colorant and the treatment liquid to a recording medium. The treatment liquid contains: an organic acid; and at least one selected from an organic acid polyvalent metal salt and a cationic polymer, a content of the at least one selected from an organic acid polyvalent metal salt and a cationic polymer is 1 to 15 percent by mass with respect to a total mass of the treatment liquid, and the treatment liquid has a pH of 5.5 or more.

14 Claims, 1 Drawing Sheet

TREATMENT LIQUID AND RECORDING METHOD

The present application is based on, and claims priority from JP Application Serial Number 2021-180991, filed Nov. 5, 2021, the disclosure of which is hereby incorporated by reference herein in its entirety.

BACKGROUND

1. Technical Field

The present disclosure relates to a treatment liquid and a recording method.

2. Related Art

Since an ink jet method is able to form a high quality image on a recording medium, various types of technical developments have been carried out in the past. For example, developments not only on a recording apparatus using an ink jet method but also on a composition to be used for the recording apparatus have been actively performed. Furthermore, trials have also been performed to overcome various types of problems to be generated when a recording apparatus, an ink jet ink composition, a treatment liquid, a recording medium, and the like are used in combination.

For example, as disclosed in JP-A-2021-091142, there has been known a recording method in which bleeding irregularity is suppressed by fixing an ink adhered to a recording medium (by decreasing a fluidity of the ink) at an early stage using a treatment liquid containing an aggregating agent which aggregates an ink component.

In the case in which the treatment liquid is used, while a member reliability of a member provided for the use of the treatment liquid is preferably maintained, a treatment liquid which is able to improve an abrasion resistance and an image quality of an image formed by an ink jet ink composition to be used in combination therewith has not been sufficiently realized.

SUMMARY

According to an aspect of the present disclosure, there is provided a treatment liquid which is a water-based treatment liquid and which is used for a recording method of adhering a water-based ink jet ink composition containing a colorant and the treatment liquid to a recording medium. The treatment liquid described above contains: an organic acid; and at least one selected from an organic acid polyvalent metal salt and a cationic polymer, a content of the at least one selected from an organic acid polyvalent metal salt and a cationic polymer is 1 to 15 percent by mass with respect to a total mass of the treatment liquid, and the treatment liquid has a pH of 5.5 or more.

According to another aspect of the present disclosure, there is provided a recording method comprising: a treatment liquid adhesion step of adhering the treatment liquid described above to the recording medium; and an ink adhesion step of adhering the ink jet ink composition to the recording medium by an ink jet method.

DESCRIPTION OF EXEMPLARY EMBODIMENTS

Figure 1:
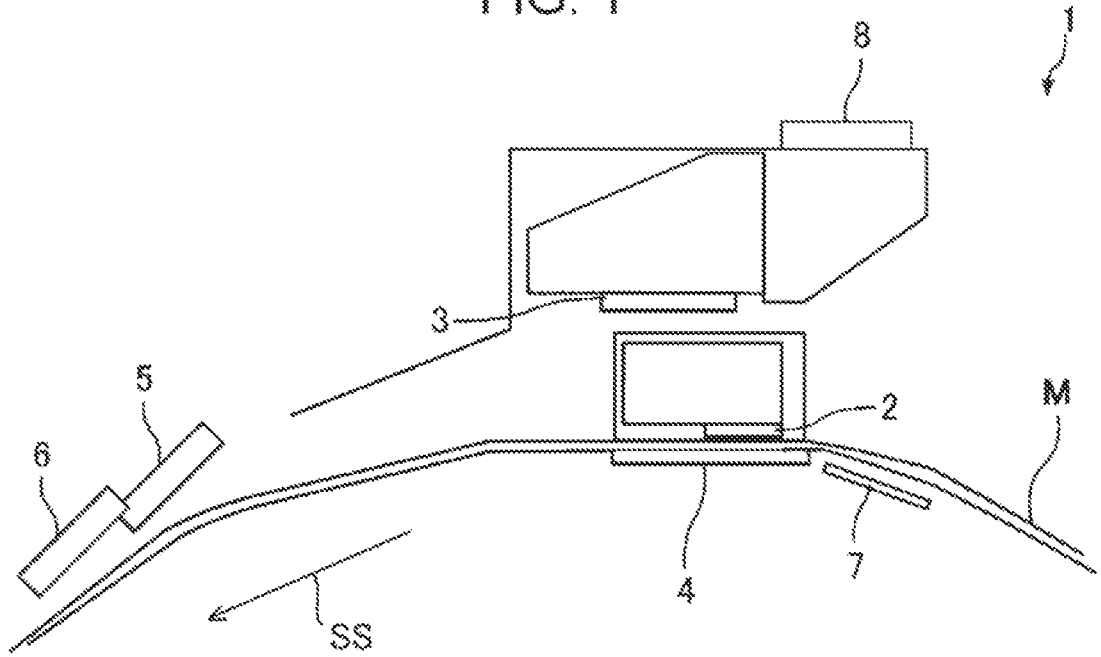
FIG. 1 is a schematic view of an example of an ink jet recording apparatus.

Hereinafter, embodiments of the present disclosure will be described. The following embodiments are described to explain examples of the present disclosure. The present disclosure is not at all limited to the following embodiments and includes various types of changed and/or modified embodiments to be performed without departing from the scope of the present disclosure. In addition, all the structures described below are not always required to be essential structures.

In this specification, "(meth)acryl" represents either acryl or methacryl, and "(meth)acrylate" represents either acrylate or methacrylate.

1. Treatment Liquid

A treatment liquid of this embodiment is a water-based treatment liquid and is used for a recording method of adhering a water-based ink jet ink composition containing a colorant and the treatment liquid described above to a recording medium. The treatment liquid contains an organic acid and at least one selected from an organic acid polyvalent metal salt and a cationic polymer. In addition, a content of the at least one selected from an organic acid polyvalent metal salt and a cationic polymer is 1 to 15 percent by mass with respect to a total mass of the treatment liquid, and the treatment liquid has a pH of 5.5 or more.

Heretofore, when the treatment liquid is used, as an aggregating agent to be contained therein, a polyvalent metal salt of an inorganic acid is used in some cases since being particularly excellent in reactivity; however, the polyvalent metal salt of an inorganic acid has deliquescence in many cases. Hence, a solvent component is not likely to be evaporated in a secondary heating step, and after recording is performed, moisture absorption is liable to occur, so that an abrasion resistance of an image may be degraded in some cases. Accordingly, although the use of a polyvalent metal salt of an organic acid or a cationic polymer, each of which has less deliquescence without seriously degrading the reactivity, was tried, compared to the polyvalent metal salt of an inorganic acid, those compounds were disadvantageous since the reactivity was degraded, and an image quality obtained thereby was not sufficient in some cases. Furthermore, although the acid may also function as the aggregating agent, the influence of the acid on a member, such as a container, was concerned.

1.1. Water-Based Treatment Liquid

The treatment liquid used for a recording method according to this embodiment is a water-based treatment liquid containing water. The "water-based" indicates that water is contained as one of primary solvent components. The water may be contained as a primary solvent component and is a component to be evaporated by drying. As the water, pure water, such as ion exchange water, ultrafiltration water, reverse osmosis water, or distilled water, or water, such as ultrapure water, in which ionic impurities are removed as much as possible is preferable. In addition, in the case in which water sterilized by ultraviolet radiation, addition of hydrogen peroxide, or the like is used, generation of fungi and bacteria can be preferably suppressed when the treatment liquid is stored for a long time.

A content of the water in the treatment liquid with respect to the total mass of the treatment liquid is preferably 40 percent by mass or more, more preferably 45 percent by mass or more, even more preferably 50 percent by mass or more, further preferably 55 percent by mass or more, even further preferably 60 percent by mass or more, and particularly preferably 65 percent by mass or more. In addition, although an upper limit of the content of the water is not particularly limited, the upper limit described above with respect to the total mass of the treatment liquid is preferably 90 percent by mass or less and more preferably 80 percent by mass or less.

1.2. Organic Acid

The treatment liquid contains an organic acid. The organic acid functions to aggregate a component of the ink jet ink composition. Compared to an inorganic acid metal salt, the organic acid is advantageous in terms of drying since having no deliquescence and is also not likely to absorb moisture, and hence, the abrasion resistance of an image formed by the ink jet ink composition can be made preferable. In addition, since the organic acid polyvalent metal salt and/or the cationic polymer is used in combination with the organic acid, the treatment liquid has an excellent aggregation performance, and the image quality of the image formed by the ink jet ink composition can also be made excellent.

Although being able to function as the aggregating agent, the organic acid also has a function to decrease the pH of the treatment liquid. Hence, when a content of the organic acid is excessively high, the pH of the treatment liquid is excessively lowered, and a member (such as a resin (epoxy resin or the like) or a metal) of a container in which the treatment liquid is received and/or a material of the recording medium to which the treatment liquid is adhered may be degraded in some cases. That is, a treatment liquid containing the organic acid as a primary component may be inferior in terms of member reliability in some cases. In addition, when the pH of the treatment liquid is excessively low, the abrasion resistance of a recorded matter tends to be degraded, and in particular, a wet abrasion resistance may be degraded in some cases. Furthermore, even after the drying, if the pH of the treatment liquid is excessively low, when moisture is applied, degradation of the recording medium and/or components, such as resins, contained in an ink coating film may occur by the presence of the acid in some cases.

However, in the treatment liquid of this embodiment, the amount of the organic acid to be used is small since the organic acid polyvalent metal salt and/or the cationic polymer is used in combination therewith, and hence, the abrasion resistance and the image quality of the image formed by the ink jet ink composition can be improved, and in addition, the member reliability can also be maintained high. In addition, the treatment liquid may be adhered to the recording medium by spray, coating, or the like or by an ink jet method. In both cases described above, the treatment liquid of this embodiment is able to enhance the member reliability.

As the organic acid, for example, there may be mentioned a poly(meth)acrylic acid, formic acid, acetic acid, propionic acid, glycolic acid, oxalic acid, malonic acid, malic acid, maleic acid, ascorbic acid, succinic acid, glutaric acid, adipic acid, fumaric acid, citric acid, tartaric acid, lactic acid, pyruvic acid, pyrrolidone carboxylic acid, pyrone carboxylic acid, pyrrole carboxylic acid, furan carboxylic acid, pyridine carboxylic acid, coumaric acid, thiophene carboxylic acid, nicotinic acid, or a derivative of one of those compounds mentioned above. The organic acid may be either a monovalent acid or a divalent acid. In addition, the organic acid may also be a hydroxy acid, such as lactic acid, having a hydroxy group. Furthermore, since an odor can be further reduced, and solubility in water is preferable, the organic acid is more preferably a divalent aliphatic organic acid, such as adipic acid or succinic acid. The organic acids may be used alone, or at least two types thereof may be used in combination.

A content in total of the organic acid with respect to the total mass of the treatment liquid is preferably 0.0001 to 5.0 percent by mass, more preferably 0.001 to 3.0 percent by mass, even more preferably 0.002 to 2.5 percent by mass, and further preferably 0.003 to 2.4 percent by mass. In addition, in view of the member reliability, an upper limit of the content of the organic acid is preferably 2.5 percent by mass or less, more preferably 1.0 percent by mass or less, even more preferably 0.3 percent by mass or less, and further preferably 0.1 percent by mass or less.

1.3. Organic Acid Polyvalent Metal Salt

The treatment liquid contains at least one selected from an organic acid polyvalent metal salt and a cationic polymer. In this section, the organic acid polyvalent metal salt will be described.

The organic acid polyvalent metal salt indicates a salt in which an organic acid and a polyvalent metal are used as a set. The organic acid polyvalent metal salt is composed of an anion of an organic acid and a cation of a polyvalent metal. As this organic acid, any one of the above organic acids may be mentioned. As the polyvalent metal, for example, an at least divalent metal, such as calcium, magnesium, copper, nickel, zinc, barium, aluminum, titanium, strontium, chromium, cobalt, or iron, may be mentioned.

As the organic acid of the organic acid polyvalent metal salt, a monovalent aliphatic organic acid, such as formic acid, acetic acid, propionic acid, or lactic acid, is preferable since having a higher aggregation ability of the component of the ink jet ink composition. On the other hand, as the polyvalent metal of the organic acid polyvalent metal salt, since being excellent in aggregating property of the component of the ink jet ink composition, calcium or magnesium is preferable. When the organic acid polyvalent metal salt is a magnesium salt or a calcium salt, stability of the treatment liquid tends to be made more preferable.

The organic acid polyvalent metal salt has a function as an aggregating agent to aggregate the component of the ink jet ink composition. In the treatment liquid, for example, since the image quality is made more preferable, the type of the organic acid described above is preferably different from the type of the organic acid of the organic acid polyvalent metal salt described above.

In addition, in the treatment liquid, when the organic acid described above is a divalent organic acid, and the organic acid polyvalent metal salt is a salt formed from a monovalent organic acid and a polyvalent metal, the drying property can be made more preferable, and the abrasion resistance of the image formed by the ink jet ink composition can be made more preferable.

The organic acid polyvalent metal salt may be used alone, or at least two types thereof may be used in combination. When the treatment liquid contains the organic acid polyvalent metal salt, a content in total of the organic acid polyvalent metal salt with respect to the total mass of the treatment liquid is preferably 0.5 to 15.0 percent by mass, more preferably 1.0 to 10.0 percent by mass, even more preferably 2.0 to 9.0 percent by mass, further preferably 3.0 to 8.0 percent by mass, and even further preferably 3.0 to 5.0 percent by mass.

1.4. Cationic Polymer

The treatment liquid contains at least one selected from an organic acid polyvalent metal salt and a cationic polymer. In this section, the cationic polymer will be described.

The cationic polymer represents a high molecular weight compound having a cationic group. As the cationic polymer, for example, a cationic urethane-based resin, a cationic olefin-based resin, or a cationic amine-based resin may be mentioned. The cationic polymer has a function as an aggregating agent to aggregate the component of the ink jet ink composition.

As the cationic urethane-based resin, a commercially available product may be used, and for example, Hydran CP-7010, CP-7020, CP-7030, CP-7040, CP-7050, CP-7060, or CP-7610 (trade name, manufactured by DIC Corporation); Superflex 600, 610, 620, 630, 640, or 650 (trade name, manufactured by DKS Co., Ltd.); or Urethane Emulsion WBR-2120C or WBR-2122C (trade name, manufactured by Taisei Fine Chemical Co., Ltd.) may be used.

The cationic olefin-based resin is a resin having a structural skeleton of an olefin, such as ethylene or propylene, and a known resin may be appropriately and selectively used. In addition, the cationic olefin-based resin may also be in the form of an emulsion in which the resin is dispersed in a solvent, such as water or an organic solvent. As the cationic olefin-based resin, a commercially available product may be used, and for example, Arrowbase CB-1200 or CD-1200 (trade name, manufactured by Unitika Ltd.) may be mentioned.

As the cationic amine-based resin (cationic polymer), a resin having an amino group in its structure may be used, and a known resin may be appropriately and selectively used. For example, a polyamine resin, a polyamide resin, or a polyallylamine resin may be mentioned. The polyamine resin is a resin having an amino group in its main skeleton. The polyamide resin is a resin having an amide group in its main skeleton. The polyallylamine resin is a resin having a structure derived from an allyl group in its main skeleton.

In addition, as the cationic polyamine-based resin, for example, there may be mentioned Unisence KHE103L manufactured by Senka Corporation (hexamethylenediamine/epichlorohydrin resin, pH of 1%-aqueous solution: approximately 5.0; viscosity: 20 to 50 (mPa·s); aqueous solution at a solid content concentration of 50 percent by mass) or Unisence KHE104L (dimethylamine/epichlorohydrin resin, pH of 1%-aqueous solution: approximately 7.0; viscosity: 1 to 10 (mPa·s); aqueous solution at a solid content concentration of 20 percent by mass). Furthermore, as a concrete example of a commercially available product of the cationic polyamine-based resin, for example, there may be mentioned FL-14 (manufactured by SNF); Arafix 100, 251S, 255, or 255LOX (manufactured by Arakawa Chemical Industries, Ltd.); DK-6810, 6853, or 6885, WS-4010, 4011, 4020, 4024, 4027, or 4030 (manufactured by Seiko PMC Corporation); Papyogene P-105 (manufactured by Senka Corporation); Sumirez Resin 650(30), 675A, 6615, or SLX-1 (manufactured by Taoka Chemical Co., Ltd.); Catiomaster (registered trademark) PD-1, PD-7, PD-30, PD-A, PDT-2, PE-10, PE-30, DT-EH, EPA-SK01, or TMHMDA-E (manufactured by Yokkaichi Chemical Company Limited); or Jetfix 36N, 38A, or 5052 (manufactured by Satoda Chemical Industrial Co., Ltd.).

As the polyallylamine resin, for example, there may be mentioned a polyallylamine hydrochloride, a polyallylamineamide sulfate, an allylamine hydrochloride-diallylamine hydrochloride copolymer, an allylamine acetate-diallylamine acetate copolymer, an allylamine hydrochloride-dimethylallylamine hydrochloride copolymer, an allylamine-dimethylallylamine copolymer, a polydiallylamine hydrochloride, a polymethyldiallylamine hydrochloride, a polymethyldiallylamineamide sulfate, a polymethyldiallylamine acetate, a polydiallyldimethylammonium chloride, a diallylamine acetate-sulfur dioxide copolymer, a diallylmethylethylammoniumethyl sulfate-sulfur dioxide copolymer, a methyldiallylamine hydrochloride-sulfur dioxide copolymer, a diallyldimethylammonium chloride-sulfur dioxide copolymer, or a diallydimethylammonium chloride-acrylamide copolymer.

The cationic polymer may be used alone, or at least two types thereof may be used in combination. When the treatment liquid contains the cationic polymer, a content in total of the cationic polymer with respect to the total mass of the treatment liquid is preferably 0.1 to 15.0 percent by mass, more preferably 0.1 to 8.0 percent by mass, even more preferably 0.5 to 5.0 percent by mass, further preferably 1.0 to 4.0 percent by mass, and even further preferably 1.0 to 3.0 percent by mass.

1.5. Content of at Least One Selected from Organic Acid Polyvalent Metal Salt and Cationic Polymer A content in total of the at least one selected from the organic acid polyvalent metal salt and the cationic polymer in the treatment liquid with respect to the total mass thereof is preferably 1.0 to 15.0 percent by mass, more preferably 1.0 to 10.0 percent by mass, even more preferably 2.0 to 9.0 percent by mass, further preferably 3.0 to 8.0 percent by mass, and even further preferably 3.0 to 5.0 percent by mass. When the content described above is in the above range, the aggregation property of the component of the ink jet ink composition by the treatment liquid can be sufficiently obtained.

1.6. Other Components

1.6.1. Water-Soluble Low Molecular Weight Organic Compound

The treatment liquid may further contain a water-soluble low molecular weight organic compound. Since the water-soluble low molecular weight organic compound is contained, the drying property of the image formed by the ink jet ink composition can be made more preferable. As the water-soluble low molecular weight organic compound, for example, although an alcohol, an alkanediol, an alkane polyol, an alkylene glycol ether, an ester, an amide, a sulfur-containing solvent, or a cyclic ether may be mentioned, the water-soluble low molecular weight organic compound is not limited thereto.

The "water-soluble" in the water-soluble low molecular weight organic compound indicates a solubility of more than 10 g per 100 g of water at 20° C. In addition, the "low molecular weight" indicates a molecular weight of 300 or less, and the molecular weight is more preferably 30 to 250, even more preferably 50 to 200, and further preferably 70 to 150. The water-soluble low molecular weight organic compound may be a water-soluble organic solvent but is not limited thereto.

As the alcohol, for example, a compound in which one hydrogen atom of an alkane is replaced by a hydroxy group may be mentioned. As the alkane, an alkane having 10 carbon atoms or less is preferable, an alkane having 6 carbon atoms or less is more preferable, and an alkane having 3 carbon atoms or less is further preferable. The number of carbon atoms of the alkane is one or more and is preferably two or more. The alkane may be either linear or branched. As the alcohol, for example, there may be mentioned methanol, ethanol, n-propyl alcohol, iso-propyl alcohol, n-butanol, 2-butanol, tert-butanol, iso-butanol, n-pentanol, 2-pentanol, 3-pentanol, or tert-pentanol.

As the alkanediol, for example, a compound in which an alkane is replaced by two hydroxy groups may be mentioned. As the alkanediol, for example, there may be mentioned ethylene glycol (alias: ethane-1,2-diol), propylene glycol (alias: propane-1,2-diol), 1,2-butanediol, 1,2-pentanediol, 1,2-hexanediol, 1,2-octanediol, 1,3-propanediol, 1,3-butylene glycol (alias: 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol (alias: isoprene glycol), 3-methyl-1,5-pentanediol, 2-ethyl-1,3-hexanediol, 3-methyl-1,5-pentanediol, 2-methylpentane-2,4-diol (alias: hexylene glycol), 1,6-hexanediol, 2-ethyl-2-methyl-1,3-propanediol, 2-methyl-2-propyl-1,3-propanediol, neopentyl glycol (alias: 2,2-dimethyl-1,3-propanediol), or pinacol (alias: 2,3-dimethyl-2,3-butanediol).

As the alkane polyol, for example, an alkanediol, a condensate in which at least two alkanediol molecules are intermolecular condensed between hydroxy groups, or an alkane having at least three hydroxy groups may be mentioned. The alkanediol mentioned above is also included in the alkane polyol.

As the condensate in which at least two alkanediol molecules are intermolecular condensed between hydroxy groups, for example, there may be mentioned a dialkylene glycol, such as diethylene glycol or dipropylene glycol, or a trialkylene glycol, such as triethylene glycol or tripropylene glycol.

The alkane having at least three hydroxy groups is a compound which has at least three hydroxy groups and a skeleton of an alkane, a polyol having a polyether structure, or the like. A compound in which an alkane or a polyol having a polyether structure is replaced by at least three hydroxy groups may be mentioned.

As the alkane having at least three hydroxy groups, for example, there may be mentioned glycerin, trimethylolethane, trimethylolpropane, 1,2,5-hexanetriol, 1,2,6-hexanetriol, pentaerythritol, or a polyoxypropylene triol.

As the alkylene glycol ether, for example, a compound in which at least one hydroxy group of the alkane polyol mentioned above is etherified may be mentioned. For example, an alkylene glycol monoether in which one hydroxy group is etherified or an alkylene glycol diether in which two hydroxy groups are etherified may be mentioned. An alkylene glycol monoether is more preferable.

By the etherification, for example, an alkyl ether or an aryl ether may be formed, and an alkyl ether is preferably formed. The number of carbon atoms of an ether portion formed by the etherification is preferably 1 to 8 and more preferably 1 to 4. The number of carbon atoms of an alkylene glycol portion of the alkylene glycol ether is preferably 2 to 6. The number of repetitions of the alkylene glycol portion is preferably 1 to 5.

As the alkylene glycol ether, for example, an alkylene glycol monoether or an alkylene glycol diether may be mentioned, and an alkylene glycol monoether is more preferable. As a concrete example, for example, there may be mentioned an alkylene glycol monoether, such as 2-methoxyethanol (alias: ethylene glycol monomethyl ether), 2-ethoxyethanol (alias: ethylene glycol monoethyl ether), ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, 1-methoxy-2-propanol (alias: propylene glycol-1-monomethyl ether), 2-methoxypropanol (alias: propylene glycol-2-monomethyl ether), 1-ethoxy-2-propanol (alias: propylene glycol monoethyl ether), propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, tripropylene glycol monobutyl ether, 3-methoxy-1-propanol (alias: 1,3-propanediol monomethyl ether), 1-methoxy-2-butanol (alias: 1,2-butanediol-1-monomethyl ether), 2-methoxy-1-butanol, 3-methoxy-1-butanol (alias: 1,3-butanediol-3-monomethyl ether), 4-methoxy-1-butanol (alias: 1,4-butanediol monomethyl ether), or 3-methoxy-3-methyl-1-butanol; or alkylene glycol diether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

As the ester, for example, an acyclic ester or a cyclic ester may be mentioned.

As the acyclic ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, or dipropylene glycol acetate propionate.

As the cyclic ester, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, δ-heptanolactone, γ-octanolactone, δ-octanolactone, δ-octanolactone, δ-nonalactone, ε-nonalactone, or ε-decanolactone; or a compound in which a hydrogen atom of a methylene group adjacent to a carbonyl group of one of those mentioned above is replaced by an alkyl group having 1 to 4 carbon atoms.

As the amide, for example, a cyclic amide or an acyclic amide may be mentioned. As the acyclic amide, for example, an alkoxyalkylamide may be mentioned.

As the cyclic amide, a lactam may be mentioned, and for example, there may be mentioned a pyrrolidone, such as 2-pyrrolidone (standard boiling point: 245° C.), 1-methyl-2-pyrrolidone, 1-ethyl-2-pyrrolidone, 1-propyl-2-pyrrolidone, or 1-butyl-2-pyrrolidone; 2-piperidone, ε-caprolactam, N-methyl-ε-caprolactam, N-cyclohexyl-2-pyrrolidone, 5-methyl-2-pyrrolidone, β-propiolactam, ω-heptalactam, or succinimide. Among those mentioned above, in particular, 2-pyrrolidone or ε-caprolactam is more preferable.

As the acyclic amide, for example, there may be mentioned an alkoxyalkylamide, such as 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-prooxy-N,N-methylethylpropionamide, 3-iso-propoxy-N,N-dimethylpropionamide, 3-iso-propoxy-N,N-diethylpropionamide, 3-iso-prooxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide; N,N-dimethylacetoacetamide, N,N-diethylacetoacetamide, N-methylacetoacetamide, N,N-dimethylisobutyramide, N,N-dimethylformamide, N,N-diethylformamide, N,N-dimethylacetamide, N,N-diethylacetamide, or N,N-dimethylpropionamide.

As the sulfur-containing solvent, for example, there may be mentioned a sulfoxide or a sulfone. As the sulfoxide, for example, there may be mentioned an acyclic sulfoxide, such as dimethyl sulfoxide or diethyl sulfoxide; or a cyclic sulfoxide, such as tetramethylene sulfoxide. As the sulfone, for example, there may be mentioned a cyclic sulfone, such as 3-methylsulfolane or sulfolane; or an acyclic sulfone, such as ethyl isopropyl sulfone, ethyl methyl sulfone, or dimethyl sulfone.

As the cyclic ether, for example, there may be mentioned tetrahydrofuran, 1,4-dioxane, dimethylisosorbide, 3-methyl-3-oxetanemethanol, 3-ethyl-3-oxetanemethanol, 2-hydroxymethyloxetane, tetrahydrofurfuryl alcohol, glycerol formal, solketal, 1,4-dioxane-2,3-diol, or dihydrolevoglucosenone.

At least two of those water-soluble low molecular weight organic compounds may be used in combination by mixing.

The standard boiling point of the water-soluble low molecular weight organic compound is preferably 300° C. or less, more preferably 270° C. or less, even more preferably 250° C. or less, further preferably 210° C. or less, and particularly preferably 190° C. or less. In addition, although a lower limit of the standard boiling point of the water-soluble low molecular weight organic compound is not particularly limited, the lower limit described above is preferably 100° C. or more, more preferably 110° C. or more, even more preferably 120° C. or more, and further preferably 150° C. or more.

In addition, when the treatment liquid is allowed to contain as the water-soluble low molecular weight organic compound, a compound having a standard boiling point of 250° C. or less at a content of 30.0 percent by mass or less, the drying property of the image formed by the ink jet ink composition can be made more preferable. In addition, as the water-soluble low molecular weight organic compound having a standard boiling point of 250° C. or less, besides the alkanediol and the alkylene glycol monoether each of which will be described later, there may be mentioned 2-pyrrolidone (abbreviation: 2P, standard boiling point: 245° C., classification: amide, phase at 25° C.: liquid), dimethylsulfoxide (abbreviation: DMSO, standard boiling point: 188° C., classification: sulfur-containing solvent, phase at 25° C.: liquid), 3-ethyl-3-oxethanemethanol (abbreviation: EOXM, standard boiling point: 220° C., classification: cyclic ether, phase at 25° C.: liquid), 1,2-hexediol (abbreviation: 1,2HD, standard boiling point: 224° C., classification: alkanediol, phase at 25° C.: liquid), or 1,5-pentanediol (abbreviation: 1,5PD, standard boiling point: 239° C., classification: alkanediol, phase at 25° C.: liquid).

Furthermore, when the treatment liquid is allowed to contain as the water-soluble low molecular weight organic compound, at least one selected from an amide, a sulfur-containing solvent, and a cyclic ether each of which has a standard boiling point of 150° C. to 300° C., the drying property of the image formed by the ink jet ink composition can be made more preferable.

A lower limit of a content in total of the water-soluble low molecular weight organic compound with respect to the total mass of the treatment liquid is preferably 10.0 percent by mass or more, more preferably 15.0 percent by mass or more, and further preferably 20.0 percent by mass or more. In addition, an upper limit of the content of the water-soluble low molecular weight organic compound with respect to the total mass of the treatment liquid is preferably 40.0 percent by mass or less, more preferably 35.0 percent by mass or less, and further preferably 30.0 percent by mass or less.

In the treatment liquid according to this embodiment, as the water-soluble low molecular weight organic compound, an alkanediol having a standard boiling point of 210° C. or less and an alkylene glycol monoether represented by general formula (1) having a standard boiling point of 210° C. or less are more preferably contained.

(1)

In the formula (1), $R^1$ represents a hydrocarbon group having 2 to 5 carbon atoms, $R^2$ represents a hydrocarbon group having 1 to 2 carbon atoms, and n represents 1 or 2.

In the above general formula (1), $R^1$ more preferably represents a linear or branched alkylene group having 2 to 5 carbon atoms. In addition, $R^1$ more preferably represents an alkylene group having 2 to 4 carbon atoms, and $R^2$ further preferably represents an alkyl group having 1 carbon atom. Furthermore, n more preferably represents 1.

As the alkanediol having a standard boiling point of 210° C. or less, for example, there may be mentioned ethylene glycol (alias: ethane-1,2-diol, standard boiling point: 196° C., phase at 25° C.: liquid, number of carbon atoms (hereinafter, represented by "C"): 2), propylene glycol (abbreviation: PG, alias: propane-1,2-diol, standard boiling point: 188° C., phase at 25° C.: liquid, C3), 1,2-butanediol (standard boiling point: 194° C., phase at 25° C.: liquid, C4), 1,3-butylene glycol (abbreviation: 1,3BG, alias: 1,3-butanediol, standard boiling point: 207° C., phase at 25° C.: liquid, C4), 2,3-butanediol (standard boiling point: 182° C., phase at 25° C.: liquid, C4), 1,2-pentanediol (standard boiling point: 210° C., phase at 25° C.: liquid, C5), 2,4-pentanediol (standard boiling point: 198° C., phase at 25° C.: liquid, C5), 3-methyl-1,3-butanediol (alias: isoprene glycol, standard boiling point: 203° C., phase at 25° C.: liquid, C5), neopentyl glycol (alias: 2,2-dimethyl-1,3-propanediol, standard boiling point: 210° C., phase at 25° C.: solid [melting point: 128° C.], C5), 2-methylpentane-2,4-diol (alias: hexylene glycol, standard boiling point: 197° C., phase at 25° C.: liquid, C6), or pinacol (alias: 2,3-dimethyl-2,3-butanediol, standard boiling point: 174° C., phase at 25° C.: solid [melting point: 43° C.], C6).

The number of carbon atoms of the alkanediol having a standard boiling point of 210° C. or less is preferably 7 or less and more preferably 2 to 6.

In addition, the standard boiling point of the alkanediol having a standard boiling point of 210° C. or less is preferably 150° C. to 210° C., more preferably 160° C. to 200° C., and further preferably 170° C. to 190° C.

Among the alkanediols described above, at least one selected from propylene glycol, 2,3-butanediol, 1,2-butanediol, 1,3-butylene glycol, 3-methyl-1,3-butanediol, and 2-methylpentane-2,4-diol is preferable, and propylene glycol, 1,2-butanediol, or 2,3-butanediol is more preferable.

As the alkylene glycol monoether represented by the general formula (1) having a standard boiling point of 210° C. or less, for example, there may be mentioned 2-methoxyethanol (alias: ethylene glycol monomethyl ether, standard boiling point: 124° C., phase at 25° C.: liquid, R=number of carbon atoms (hereinafter, represented by "C") 2; $R_2$=C1; n=1); 2-ethoxyethanol (alias: ethylene glycol monoethyl ether, standard boiling point: 136° C., phase at 25° C.: liquid, $R_1$=C2; $R_2$=C2; n=1); 1-methoxy-2-propanol (abbreviation: PM, alias: propylene glycol-1-monomethyl ether, standard boiling point: 120° C., phase at 25° C.: liquid, $R_1$=C3; $R_2$=C1; n=1); 1-ethoxy-2-propanol (abbreviation: PE, alias: propylene glycol monoethyl ether, standard boiling point: 132° C., phase at 25° C.: liquid, $R_1$=C3; $R_2$=C2; n=1); 2-methoxypropanol (alias: propylene glycol-2-monomethyl ether, standard boiling point: 102° C., phase at 25° C.: liquid, R=C3; $R_2$=C1; n=1); 3-methoxy-1-propanol (alias: 1,3-propandediol monomethyl ether, standard boiling point: 153° C., phase at 25° C.: liquid, $R_1$=C3; $R_2$=C1; n=1); 1-methoxy-2-butanol (alias: 1,2-butanediol-1-monomethyl ether, standard boiling point: 135° C., phase at 25° C.: liquid, $R_1$=C4; $R_2$=C1; n=1); 2-methoxy-1-butanol (standard boiling point: 146° C., phase at 25° C.: liquid, $R_1$=C4; $R_2$=C1; n=1); 3-methoxy-1-butanol (abbreviation: MB, alias: 1,3-butanediol-3-monomethyl ether, standard boiling point: 158° C., phase at 25° C.: liquid, $R_1$=C4; $R_2$=C1; n=1); 4-methoxy-1-butanol (alias: 1,4-butanediol monomethyl ether, standard boiling point: 165° C., phase at 25° C.: liquid, $R_1$=C4; $R_2$=C1; n=1); 3-methoxy-3-methyl-1-butanol (abbreviation: MMB, standard boiling point: 174° C., phase at 25° C.: liquid, $R_1$=C5; $R_2$=C1; n=1); diethylene glycol monomethyl ether (standard boiling point: 194° C., phase at 25° C.: liquid, $R_1$=C2; $R_2$=C1; n=2); diethylene glycol monoethyl ether (standard boiling point: 202° C., phase at 25° C.: liquid, $R_1$=C2; $R_2$=C2; n=2); or dipropylene glycol monomethyl ether (abbreviation: DPM, standard boiling point: 190° C., phase at 25° C.: liquid, $R_1$=C3; $R_2$=C1; n=2).

The standard boiling point of the alkylene glycol monoether represented by the general formula (1) having a standard boiling point of 210° C. or less is preferably 110° C. to 210° C., more preferably 130° C. to 190° C., and further preferably 140° C. to 180° C.

Among the alkylene glycol monoethers described above, at least one selected from 3-methoxy-1-butanol, 1-methoxy-2-propanol, 1-ethoxy-2-propanol, 3-methoxy-3-methyl-1-butanol, and dipropylene glycol monomethyl ether is preferable, and 3-methoxy-1-butanol, 3-methoxy-3-methyl-1-butanol, or 1-methoxy-2-propanol is more preferable. When the above alkylene glycol monoether is the compound as described above, the abrasion resistance tends to be made more preferable.

When the alkanediol having a standard boiling point of 210° C. or less is used, a content thereof with respect to the total mass of the treatment liquid is preferably 10.0 to 25.0 percent by mass. A lower limit of the content described above is more preferably 11.0 percent by mass or more, even more preferably 12.0 percent by mass or more, further preferably 13.0 percent by mass or more, and even further preferably 14.0 percent by mass or more. An upper limit of the content described above is more preferably 23.0 percent by mass or less, more preferably 21.0 percent by mass or less, further preferably 19.0 percent by mass or less, and even further preferably 17.0 percent by mass or less.

When the lower limit of the content of the alkanediol is 10 percent by mass or more, the drying property of the image formed by the ink jet ink composition can be made more preferable.

In addition, when the alkylene glycol monoether represented by the general formula (1) having a standard boiling point of 210° C. or less is used, a content thereof with respect to the total mass of the treatment liquid is preferably 2.0 to 10 percent by mass. A lower limit of the content described above is more preferably 2.5 percent by mass or more, even more preferably 3.0 percent by mass or more, further preferably 3.5 percent by mass or more, and even further preferably 4.0 percent by mass or more. An upper limit of the content described above is more preferably 9.0 percent by mass or less, more preferably 8.0 percent by mass or less, further preferably 7.0 percent by mass or less, even further preferably 6.0 percent by mass or less, and particularly preferably 5.0 percent by mass or less.

When the lower limit of the content of the alkylene glycol monoether represented by the general formula (1) having a standard boiling point of 210° C. or less is 2.0 percent by mass or more, wet spreadability of the treatment liquid to a low-absorbing recording medium or a non-absorbing recording medium tends to be further improved.

1.6.2. Surfactant

The treatment liquid may also contain a surfactant. Since the surfactant has a function to decrease a surface tension of the treatment liquid and to improve wettability thereof to a recording medium or an under layer, the image quality of the image formed by the ink jet ink composition can be improved. Among the surfactants, an acetylene glycol-based surfactant, a silicone-based surfactant, or a fluorine-based surfactant may be preferably used.

Although the acetylene glycol-based surfactant is not particularly limited, for example, there may be mentioned Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, or DF110D (trade name, manufactured by Air Products & Chemicals Inc.); Olfine B, Y, P, A, STG, SPC, E1004, E1010, PD-001, PD-002W, PD-003, PD-004, EXP.4001, EXP.4036, EXP.4051, AF-103, AF-104, AK-02, SK-14, or AE-3 (trade name, manufactured by Nisshin Chemical Industry Co., Ltd.); or Acetylenol E00, EGOP, E40, or E100 (trade name, manufactured by Kawaken Fine Chemicals Co., Ltd.).

Although the silicone-based surfactant is not particularly limited, a polysiloxane-based compound is preferably mentioned. Although the polysiloxane-based compound is not particularly limited, for example, a polyether modified organosiloxane may be mentioned. As a commercially available product of the polyether modified organosiloxane, for example, there may be mentioned BYK-306, BYK-307, BYK-333, BYK-341, BYK-345, BYK-346, BYK-348, BYK-349, BYK-3420, BYK-3480, or BYK-3481 (trade name, manufactured by BYK Japan KK); or KF-351A, KF-352A, KF-353, KF-354L, KF-355A, KF-615A, KF-945, KF-640, KF-642, KF-643, KF-6020, X-22-4515, KF-6011, KF-6012, KF-6015, or KF-6017 (trade name, manufactured by Shin-Etsu Chemical Co., Ltd.).

As the fluorine-based surfactant, for example, a fluorine modified polymer is preferably used, and as a concrete example, BYK-3440 (trade name, manufactured by BYK Japan KK); Surflon δ-241, δ-242, or δ-243 (trade name, manufactured by AGC Seimi Chemical Co., Ltd.); or Ftergent 215M (trade name, manufactured by Neos Co., Ltd.) may be mentioned.

The surfactant may be used alone, or at least two types thereof may be used in combination.

When the surfactant is used, a content thereof with respect to the total mass of the treatment liquid is preferably 0.2 to 1.2 percent by mass. A lower limit of the content of the surfactant is more preferably 0.3 percent by mass or more, even preferably 0.4 percent by mass or more, and further preferably 0.5 percent by mass or more. In addition, an upper limit of the content of the surfactant is more preferably 1.0 percent by mass or less, even preferably 0.8 percent by mass or less, and further preferably 0.7 percent by mass or less.

In addition, in the treatment liquid, since the silicone-based surfactant is contained therein at a content of 0.1 to 4.0 percent by mass with respect to the total mass of the treatment liquid, the image quality of the image formed by the ink jet ink composition can be further improved. In addition, in view of the same point as described above, with respect to the total mass of the treatment liquid, the silicone-based surfactant is more preferably contained at a content of 0.1 to 0.8 percent by mass, and the acetylene glycol-based surfactant is more preferably contained at a content of 0.1 to 0.4 percent by mass.

In addition, although a cationic surfactant may also be used in the treatment liquid, since having an action to aggregate the component of the ink jet ink composition in some cases, the cationic surfactant may also be auxiliarily used for the aggregating action by the organic acid, the organic acid polyvalent metal salt, and the cationic polymer described above. In addition, the cationic surfactant is more preferably used so as not to have an influence on the aggregating action by the organic acid, the organic acid polyvalent metal salt, and the cationic polymer described above.

As the cationic surfactant, for example, there may be mentioned a primary, a secondary, or a tertiary amine salt type compound, an alkylamine salt, a dialkylamine salt, an aliphatic amine salt, a benzalkonium salt, a quaternary ammonium salt, a quaternary alkylammonium salt, an alkylpyridinium salt, a sulfonium salt, a phosphonium salt, an onium salt, or an imidazolinium salt. In particular, for example, there may be mentioned a hydrochloride, an acetate, or the like of laurylamine, palm amine, or rosin amine, lauryltrimethylammonium chloride, cetyltrimethyl- ammonium chloride, benzyltributylammonium chloride, benzalkonium chloride, dimethylethyllaurylammonium ethyl sulfate, dimethylethyloctylammonium ethyl sulfate, trimethyllaurylammonium hydrochloride, cetylpyridinium chloride, cetylpyridinium bromide, dihydroxyethyllaurylamine, decyldimethylbenzylammonium chloride, dodecyldimethylbenzylammonium chloride, tetradecyldimethylammonium chloride, hexadecyldimethylammonium chloride, or octadecyldimethylammonium chloride.

1.6.3. Others

Aggregating Agent

The treatment liquid may contain, as an aggregating agent other than the organic acid, the organic acid polyvalent metal salt, and the cationic polymer, an inorganic acid, a metal salt thereof, or the like. However, since those aggregating agents each have a deliquescent action in some cases, the amount thereof is preferably as small as possible.

Others

The treatment liquid may also contain components, such as a pH adjuster, an antiseptic agent/fungicide, a corrosion inhibitor, a chelating agent, an antioxidant, and/or an antifungal agent.

1.7. pH of Treatment Liquid

The pH of the treatment liquid of this embodiment is 5.5 or more. The pH of the treatment liquid can be adjusted by selection from the organic acid, the organic acid polyvalent metal salt, the cationic polymer, the pH adjuster, and the like and/or by adjustment of blending amounts thereof. Since the pH of the treatment liquid is 5.5 or more, a member of a container in which the treatment liquid is received, a member of a path through which the treatment liquid passes, and a recording medium to which the treatment liquid is adhered can be suppressed from being degraded. That is, since the pH of the treatment liquid is not excessively low, the member reliability can be secured. The pH of the treatment liquid is preferably 5.5 to 8, more preferably 5.5 to 7.5, even more preferably 6.0 to 7.5, and further preferably 6.5 to 7.5. Accordingly, the degradation of the member of the container and the recording medium can be further suppressed.

In addition, the pH of the treatment liquid is more preferably in a specific range with respect to a pH of the ink jet ink composition which will be described later. That is, the pH of the treatment liquid is preferably lower than the pH of the ink jet ink composition which will be described later, more preferably lower by 1.5 or more, further preferably lower by 1.8 or more, and particularly preferably lower by 2.0 or more. Accordingly, the aggregation ability of the component of the water-based ink jet ink composition containing a colorant is made more preferable, and an image having a more excellent image quality can be obtained.

In addition, the pH of the treatment liquid is lower than the pH of the ink jet ink composition which will be described later preferably by 3 or less, more preferably by 2.5 or less, and further preferably by 2.0 or less.

When the ink jet ink composition is alkaline, the organic acid in the treatment liquid has a function to aggregate the component of the ink by degrading a dispersion stability of an anionic dispersible component in the ink; however, when the dispersible component contained in the ink is brought into contact with a treatment liquid having a low pH (acidic property), depending on the dispersible component described above, the dispersion stability thereof may be likely to be degraded or may be unlikely to be degraded. In addition, when a component the dispersion stability of which is not likely to be degraded is contained in the ink, the organic acid may be inferior to the polyvalent metal salt in terms of reactivity in some cases.

1.8. Operational Effect

According to the treatment liquid of this embodiment, since at least one selected from the organic acid polyvalent metal salt and the cationic polymer and the organic acid are contained, the aggregation ability of the component of the water-based ink jet ink composition containing a colorant is preferable, and the drying property thereof is also preferable. Accordingly, the image quality and the abrasion resistance of the image formed by the ink jet ink composition can be made preferable. In addition, by this treatment liquid, since the pH is not excessively low, the member reliability can also be secured.

Although the organic acid polyvalent metal salt and the cationic polymer each have a high pH in general, the organic acid has a low pH. In the treatment liquid of this embodiment, since a small amount of the organic acid is used for the organic acid polyvalent metal salt and cationic polymer to control a pH of 5.5 or more, the member reliability is secured, and the (wet) abrasion resistance of the image can also be made excellent. In addition, when the content of the organic acid is excessively high, the pH is excessively lowered, and the member reliability is degraded. In this case, when the treatment liquid is used for an ink jet method, a problem on durability of a head and a problem on generation of rust of a metal portion of an apparatus are liable to occur.

2. Recording Method

A recording method of this embodiment includes a treatment liquid adhesion step of adhering the treatment liquid described above to a recording medium and an ink adhesion step of adhering an ink jet ink composition to the recording medium by an ink jet method. In the recording method of this embodiment, the treatment liquid described above is used. That is, the recording method of this embodiment is performed such that a water-based ink jet ink composition containing a colorant and the treatment liquid described above are adhered to a recording medium.

2.1. Recording Medium

A recording medium on which an image is formed by the recording method according to this embodiment may have or may not have a recording surface to absorb a liquid, such as the ink jet ink composition. Hence, the recording medium is not particularly limited, and for example, a liquid absorbing recording medium, such as paper or a cloth, a liquid low-absorbing recording medium, such as printing paper, or a liquid non-absorbing recording medium, such as a metal, a glass, a film, or a plastic, may be mentioned.

However, an excellent effect of the recording method of this embodiment is more significant when an image is recorded on a liquid low-absorbing recording medium or a liquid non-absorbing recording medium. That is, according to the recording method of this embodiment, even on a low-absorbing recording medium or a non-absorbing recording medium in which aggregation irregularity is relatively liable to occur, an image having a high image quality and a preferable abrasion resistance can be formed, and hence, an effect of improving the abrasion resistance and the image quality of the image formed by the ink jet ink composition can be more significantly obtained.

The liquid non-absorbing recording medium or the liquid low-absorbing recording medium indicates a recording medium absorbing no liquid or a recording medium absorbing almost no liquid, respectively. From a quantitative point of view, the liquid non-absorbing recording medium or the liquid low-absorbing recording medium indicates a recording medium having a water absorbing amount of 10 mL/m$^2$ or less from a contact start to a point of 30 msec$^{1/2}$ by Bristow method. This Bristow method is a most popular measurement method of a liquid absorption amount in a short time and has also been employed by Japan Technical Association of the Pulp and Paper Industry (JAPAN TAPPI). The details of the test method have been disclosed in Standard No. 51 "Paper and Paperboard-Liquid Absorption Test Method-Bristow Method", JAPAN TAPPI PAPER AND PULP TEST METHODS, 2000. On the other hand, a liquid absorbing recording medium indicates a recording medium corresponding to neither the liquid non-absorbing recording medium nor the liquid low-absorbing recording medium. In addition, in this specification, the liquid low-absorbing recording medium and the liquid non-absorbing recording medium are simply called the low-absorbing recording medium and the non-absorbing recording medium, respectively.

As the liquid non-absorbing recording medium, for example, there may be mentioned a film or a plate of a plastic, such as a poly(vinyl chloride), a polyethylene, a polypropylene, or a poly(ethylene terephthalate) (PET); a plate of a metal, such as iron, silver, copper, or aluminum; a metal plate or a plastic-made film formed by deposition of at least one of the various types of metals mentioned above, or a plate of an alloy, such as stainless steel or brass. In addition, for example, there may be mentioned a medium in which a plastic is coated on a substrate, such as paper, a medium in which a plastic film is adhered to a substrate, such as paper, or a medium formed from a plastic film having no absorbing layer (receiving layer). As the plastic described above, for example, there may be mentioned a poly(vinyl chloride), a poly(ethylene terephthalate), a polycarbonate, a polystyrene, a polyurethane, a polyethylene, or a polypropylene.

In addition, as the liquid low-absorbing recording medium, a recording medium having a surface on which a coating layer (receiving layer) to receive a liquid is provided may be mentioned. For example, as a low-absorbing recording medium using paper as the substrate, printing paper may be mentioned, and as a low-absorbing recording medium using a plastic film as the substrate, a recording medium in which, for example, a hydrophilic polymer is applied on a surface formed, for example, from a poly(vinyl chloride), a poly(ethylene terephthalate), a polycarbonate, a polystyrene, a polyurethane, a polyethylene, or a polypropylene or a recording medium in which particles formed of silica, titanium, or the like are applied together with a binder on the surface as described above may be mentioned.

Although the liquid absorbing recording medium is not particularly limited, for example, there may be mentioned regular paper, such as electrophotographic paper, having a high liquid permeability; ink jet paper (ink jet exclusive paper having an ink absorbing layer formed from silica particles or aluminum particles or having an ink absorbing layer formed from a hydrophilic polymer, such as a poly (vinyl alcohol) (PVA) or a poly(vinyl pyrrolidone) (PVP)); or art paper, coated paper, cast paper, or the like which has a relatively low liquid permeability and which is used for general offset printing. Furthermore, as the liquid absorbing recording medium, for example, a cloth or a non-woven cloth may also be mentioned.

In addition, the recording medium may be colorless transparent, translucent, colored transparent, colored opaque, achromatic opaque, or the like. In addition, the recording medium itself may be colored and/or may be translucent or transparent.

2.2. Treatment Liquid Adhesion Step

The treatment liquid adhesion step is a step of adhering the treatment liquid to the recording medium. As a method to adhere the treatment liquid to the recording medium, one of a non-contact method and a contact method, such as an ink jet method, a coating method, a method of applying the treatment liquid to the recording medium using various types of sprays, a method of applying the treatment liquid by immersing the recording medium therein, and a method of applying the treatment liquid to the recording medium by a brush or the like, may be used, or at least two of the methods described above may be used in combination.

The treatment liquid adhesion step may be performed such that for example, by an ink jet recording apparatus 1 as shown in FIG. 1, the treatment liquid may be ejected from an ink jet head 2. Accordingly, the treatment liquid and the ink jet ink composition can be more preferably adhered to the recording medium by one ink jet recording apparatus.

The treatment liquid adhesion step may be performed either before or after the ink composition is adhered and may also be performed at the same time when the ink composition is adhered.

An adhesion amount of the treatment liquid per unit area of a recording region of the recording medium is preferably 0.1 to 5 mg/inch$^2$, more preferably 0.3 to 4 mg/inch$^2$, even more preferably 0.5 to 3 mg/inch$^2$, and further preferably 0.7 to 1.5 mg/inch$^2$. In the recording, the maximum adhesion amount of the treatment liquid per unit area of the recording region of the recording medium is also preferably set in the range described above.

2.3. Ink Adhesion Step

The ink adhesion step may be performed by any method as long as the ink jet ink composition is adhered while a recording head and a recording medium are relatively scanned. For example, the ink adhesion step is preferably performed by an ink jet method in which the recording head is used as an ink jet head, and the ink jet ink composition is ejected from the ink jet head. Accordingly, by a small apparatus, low-volume high-mix printing can be efficiently performed. Besides the ink jet method, the adhesion of the ink may also be performed by an analogue printing method or the like.

The ink jet method is a recording method in which fine liquid droplets of an ink jet ink are ejected from an ejection nozzle of an ink jet head provided in a recording apparatus, such as an ink jet printer, so as to be adhered to a recording medium or the like.

The ink adhesion step can be easily performed such that, for example, by using the ink jet recording apparatus 1 shown in FIG. 1 which is one embodiment of an ink jet recording apparatus described below, an ink is ejected from the ink jet head 2. In addition, a composition to be ejected from the ink jet head by an ink jet method and to be used for recording is called an ink jet ink composition.

An adhesion amount of the ink jet ink composition per unit area of the recording region of the recording medium is preferably 1 to 40 mg/inch$^2$, more preferably 2 to 30 mg/inch$^2$, even more preferably 4 to 20 mg/inch$^2$, and further preferably 6 to 16 mg/inch$^2$. In the recording, the maximum ink adhesion amount per unit area of the recording region of the recording medium is also preferably set in the range described above.

In addition, in the ink adhesion step of the recording method according to this embodiment, while the ink jet ink composition described above is ejected from the ink jet head, a main scanning in which a relative position between the recording medium and the ink jet head is transferred is preferably performed a plurality of times, and the number of main scannings performed on the same main scanning region is preferably 12 or less. An upper limit of the number of main scannings performed on the same main scanning region is more preferably 11 or less, even more preferably 10 or less, and further more preferably 9 or less. Although a lower limit of the number of main scannings is 1 or more and is not particularly limited, the lower limit described above is preferably 2 or more and more preferably 3 or more.

In the main scanning, a time of one main scanning is preferably 0.5 to 5 seconds, more preferably 1 to 4 seconds, and further preferably 2 to 3 seconds. The time of one main scanning (also called "main scanning time" in some cases) is a time required in one main scanning, to transfer a head location from a position facing one end of the recording medium to a position facing the other end thereof.

The ink adhesion step may be performed on a recording medium having a surface temperature of 50° C. or less. That is, the ink adhesion step may be performed by ventilation or the like without heating of the recording medium or may be performed with heating, and when the heating is performed, the recording medium is heated to have a surface temperature of 50° C. or less. Accordingly, an image having preferable image quality and abrasion resistance can be obtained with a preferable drying property. In addition, the ink adhesion step may be performed with cooling, if needed.

When the ink jet ink composition is adhered to the recording medium, the ink adhesion step is more preferably performed at a surface temperature of the recording medium of 45° C. or less. That is, the ink adhesion step may be performed either with or without heating the recording medium. Even when the heating is performed, the recording medium is preferably heated to have a surface temperature of 45° C. or less.

An upper limit of the surface temperature of the recording medium is more preferably 42° C. or less, even more preferably 38° C. or less, further more preferably 32° C. or less, and even further more preferably 28° C. or less. A lower limit of the surface temperature described above is preferably 20° C. or more, more preferably 23° C. or more, and further preferably 25° C. or more.

According to the recording method of this embodiment, since the treatment liquid described above is used, an image of the ink jet ink composition having preferable image quality and abrasion resistance can be obtained.

The ink jet ink composition used in the recording method of this embodiment is a water-based composition containing at least a colorant. Since the water-based, the water, and the content thereof are similar to those of the treatment liquid described above, the description thereof is omitted. In addition, in this specification, the "ink jet ink composition" may be abbreviated as the "ink composition", the "ink", or the like in some cases.

Colorant

The ink jet ink composition to be used for the recording method according to this embodiment contains a colorant.

As the colorant, both a pigment and a dye may be used, and for example, an inorganic pigment, such as carbon black or titanium white, an organic pigment, an oil soluble dye, an acidic dye, a direct dye, a reactive dye, a basic dye, a dispersive dye, or a sublimation dye may be used. The ink composition described above preferably contains a pigment, and the pigment may be dispersed by a dispersion resin.

Pigment

As the inorganic pigment, for example, a carbon black (C.I. Pigment Black 7), such as a furnace black, a lamp black, an acetylene black, or a channel black, an iron oxide, a titanium oxide, a zinc oxide, or a silica may be used.

As the organic pigment, for example, there may be mentioned a quinacridone-based pigment, a quinacridone-quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, or an azo-based pigment.

As a concrete example of the organic pigment used in the ink composition described above, for example, the following may be mentioned.

As a cyan pigment, for example, C.I. Pigment Blue 1, 2, 3, 15:3, 15:4, 15:34, 16, 22, or 60; or C.I. Vat Blue 4 or 60 may be mentioned, and for example, one selected from the group consisting of C.I. Pigment Blue 15:3, 15:4, and 60 or a mixture containing at least two types thereof may be preferably mentioned.

As a magenta pigment, for example, C.I. Pigment Red 5, 7, 12, 48 (Ca), 48 (Mn), 57 (Ca), 57:1, 112, 122, 123, 168, 184, 202, or 209 or C.I. Pigment Violet 19 may be mentioned, and for example, one selected from the group consisting of C.I. Pigment Red 122, 202, and 209, and C.I. Pigment Violet 19 or a mixture containing at least two types thereof may be preferably mentioned.

As a yellow pigment, for example, C.I. Pigment Yellow 1, 2, 3, 12, 13, 14C, 16, 17, 73, 74, 75, 83, 93, 95, 97, 98, 119, 110, 114, 128, 129, 138, 150, 151, 154, 155, 180, or 185 may be mentioned, and for example, one selected from the group consisting of C.I. Pigment Yellow 74, 109, 110, 128, 138, 150, and 180 or a mixture containing at least two types thereof may be preferably mentioned.

Pigments other than those mentioned above may also be used. For example, an orange pigment and/or a green pigment may be mentioned.

The pigments mentioned above by way of example are examples of preferable pigments, and the present disclosure is not limited thereto. Those pigments may be used alone, or at least two types thereof may be used as a mixture, and those pigments each may be used with a dye in combination.

In addition, the pigment may be used after being dispersed using a dispersant selected from a water-soluble resin, a surfactant, and the like or may be used after being dispersed as a self-dispersible pigment by oxidizing or sulfonizing a pigment surface using ozone, hypochlorous acid, fuming sulfuric acid, or the like. In addition, as the surfactant which may be used as the dispersant, a surfactant which may be contained in the ink composition described later may also be used.

In the water-soluble resin used as the dispersant, the following hydrophilic group-containing monomer and hydrophobic group-containing monomer may be used.

Hydrophilic Group-Containing Monomer and Hydrophobic Group-Containing Monomer

The water-soluble resin may include a hydrophilic group, such as a hydroxy group, a carboxy group, a sulfonic group, or a phosphoric group, to have hydrophilicity. As a hydroxy group-containing monomer in the water-soluble resin, for example, there may be used 2-hydroxyethyl (meth)acrylate, 2-(2-hydroxyethoxy)ethyl (meth)acrylate, 2-hydroxypropyl (meth)acrylate, diethylene glycol (meth)acrylate, ethyl-2-hydroxymethyl-2-propanoate, or 2,3-dihydorxypropyl (meth)acrylate. In addition, as a carboxy group-containing monomer in this polymer, for example, there may be used acrylic acid, methacrylic acid, crotonic acid, propyl (meth) acrylic acid, isopropyl (meth)acrylic acid, itaconic acid, or fumaric acid. In addition, for example, ω-carboxy-polycaprolactone mono(meth)acrylate, phthalic acid monohydroxyethyl (meth)acrylate, or (meth)acrylic acid dimer may also be used. Although those mentioned above may be used alone, or at least two types thereof may be used in combination, acrylic acid and/or methacrylic acid is preferable.

Hydrophobic Group-Containing Monomer

The water-soluble resin preferably includes a hydrophobic group. In addition, the hydrophobic group indicates a group having a high hydrophobicity compared to that of the hydrophilic group included in the water-soluble resin. As the hydrophobic group as described above, for example, an aromatic group, a cyclic aliphatic hydrocarbon group having 5 carbon atoms or more, or a chain aliphatic hydrocarbon group having 8 carbon atoms or more may be mentioned. As the aromatic group, a substituted or unsubstituted benzyl group may be mentioned, and as the cyclic aliphatic hydrocarbon group, a substituted or unsubstituted cycloalkyl group, such as cyclopentane, cyclohexane, or cycloheptane, may be mentioned. In addition, as the chain aliphatic hydrocarbon group, an alkyl group, such as an ethylhexyl group, an octyl group, a nonyl group, a decyl group, an undecyl group, or dodecyl group, may be mentioned.

As the hydrophobic group-containing monomer in the water-soluble resin, for example, styrene, benzyl (meth) acrylate, paracumyl phenoxyethylene glycol (meth)acrylate, or phenol EO-modified acrylate, may be mentioned as a monomer having an aromatic group. In addition, as a monomer having a cyclic aliphatic hydrocarbon group, for example, cyclopentyl (meth)acrylate, cyclohexyl (meth) acrylate, cycloheptane (meth)acrylate, or isobornyl meth (meth)acrylate may be mentioned. As a monomer having a chain aliphatic hydrocarbon group, for example, besides octyl (meth)acrylate, decyl (meth)acrylate, dodecyl (meth) acrylate, ethylhexyl (meth)acrylate, ethyl (meth)acrylate, or butyl (meth)acrylate, an urethane-modified (meth)acrylate or an epoxy-modified (meth)acrylate may also be used. In addition, the hydrophobic group-containing monomer preferably contains neither a hydroxy group nor a carboxy group.

Method for Manufacturing Water-Soluble Resin

The water-soluble resin to be used as the dispersant may be obtained using a known polymer polymerization method. That is, the water-soluble resin may be obtained by solution polymerization or emulsion polymerization. As a polymerization initiator, besides potassium persulfate or ammonium persulfate, there may be used a general polymerization initiator to be used for radical polymerization, such as hydrogen persulfate, azobisisobutyronitrile, azobisisovaleronitrile, azobisacetoxyphenylethane, azobismethylbutaneamide dihydrochloride tetrahydrate, azobismethylbutyronitrile, azobiscyclohexanecarbonitrile, dimethylazobisisobutyrate, azobiscyanovaleric acid, benzoyl peroxide, dibutyl peroxide, peracetic acid, cumenehydroxy peroxide, t-butylhydroxy peroxide, or paramenthanehydroxy peroxide.

Under the presence of the polymerization initiator described above, the polymerization may be performed by solution polymerization in a solvent, such as an aliphatic hydrocarbon-based solvent, an aromatic hydrocarbon-based solvent, an ester-based solvent, a ketone-based solvent, an alcohol-based solvent, or an aprotic-based solvent. The polymerization is performed generally at 30° C. to 100° C. and preferably at 50° C. to 80° C. for 1 to 10 hours, and the conditions are appropriately selected in consideration of, for example, the types of the polymerization initiator, the monomer, and the solvent to be used. In addition, the polymerization is preferably performed in an inert gas atmosphere, such as in nitrogen. After the polymerization, by a known method, such as reprecipitation and/or solvent removal, a copolymer can be isolated from a reaction solution. In addition, the copolymer thus obtained can be refined by removing unreacted monomers and the like by reprecipitation, membrane separation, a chromatographic method, an extraction method, and/or the like.

In addition, a polymer having an acidic group such as a carboxy group is preferably ionized by a neutralizer (alkaline agent). As the neutralizer (alkaline agent), there may be used an inorganic alkali, such as sodium hydroxide, potassium hydroxide, or lithium hydroxide, or an organic amine, such as ammonia, trimethylamine, tripropylamine, tributylamine, diethylmethylamine, dipropylmethylamine, dibutylmethylamine, dipropylbutylamine, triethanolamine, tripropanolamine, or tributanolamine. When the polymer described above is synthesized, a composition of those polymerizable monomers is designed so as to obtain a preferably monomer composition.

Resin Coated Pigment and Pigment Dispersion Liquid in which Resin Coated Pigment is Dispersed In the ink jet ink composition according to this embodiment, the pigment described above may be dispersed as a resin-coated pigment which is coated with a water-soluble resin. The resin-coated pigment is dispersible in a water-based medium in the form of a pigment coated or enclosed with a high molecular weight compound, and a pigment dispersion liquid has a water phase in which the resin-coated pigment is dispersed.

Method for Manufacturing Resin-Coated Pigment

The resin-coated pigment is formed by a known physical/mechanical method or chemical method. In particular, for example, a phase separation method (coacervation), a liquid drying method (interface precipitation method), a spray drying method, a pan coating method, a liquid curing coating method, an interface polymerization method, an in-situ method, or an ultrasonic method may be used without any particular restriction.

For example, when a monomer of the water-soluble resin is polymerized by emulsion polymerization or the like under the presence of the pigment, the resin-coated pigment can be obtained. That is, a polymerization reaction is performed under predetermined conditions by adding a polymerizable monomer and a polymerization initiator with a chain transfer agent, if needed, to a system in which the pigment is dispersed. A dispersion system of the pigment may also be formed using a dispersant having a polymerizable group which can be copolymerized with another monomer. In particular, in a reaction chamber equipped with an ultrasonic generator, a stirrer, and a temperature regulator, a pulverization treatment is performed by radiating ultrasonic waves for a predetermined time using the pigment and water with a polymerizable surfactant, if needed. Besides the ultrasonic dispersion method using an ultrasonic generator, a dispersion method using a general dispersing device, such as a ball mill, a roll mill, or an eiger mill, or a dispersion method by a high-speed mixer, a bead mill, a sand mill, or a roll mill, may also be used. Subsequently, the monomer and the polymerization initiator are further added, and the polymerization reaction is performed at a predetermined temperature, so that the resin-coated pigment can be more preferably obtained. In addition, the chain transfer agent may also be added in the reaction chamber.

As a preferable method for manufacturing a resin-coated pigment, a phase inversion emulsification method may be mentioned. A water-soluble resin to be applied to a phase inversion emulsification method is preferably synthesized by solution polymerization. In addition, the water-soluble resin described above is preferably synthesized by solution polymerization using a radical polymerization initiator. A resin dispersion liquid obtained by the solution polymerization may also be directly used in a pigment dispersion step. As one example of the phase inversion emulsification method, a pigment dispersion step may be included in which after a mixed solution containing a resin, a pigment, an organic solvent, and water in an excessive amount with respect to the above organic solvent is prepared, at least part of the resin is dispersed in a water phase of the mixed solution so as to cover the pigment. In addition, the resin and the pigment present in the water phase of the pigment dispersion liquid thus obtained are used together with at least part of the water phase or separately from the water phase, so that the ink composition can be prepared. In the phase inversion emulsification, the organic solvent may be distilled off.

The pigment dispersion step may be performed, for example, as described below. That is, a pigment is dispersed in an organic solvent to prepare a pigment dispersion liquid (organic solvent), a resin is dispersed or dissolved in water to prepare a resin dispersion liquid, and the pigment dispersion liquid (organic solvent) and the resin dispersion liquid are mixed together. Accordingly, a state in which the resin is localized in the vicinity of the pigment surface so as to cover the pigment is formed in a water phase (phase inversion emulsification). Alternatively, a dispersion liquid of an organic solvent containing a pigment and a resin (at least one selected from a neutralizer, water, and a surfactant is appropriately contained in combination) is prepared, and a large amount of water (preferably excessive with respect to that of the organic solvent) is mixed therewith, so that the pigment and the resin are transferred from an organic solvent phase to a water phase. As a result, a state in which the pigment is covered (enclosed) with the resin can be formed in the water phase.

In the pigment dispersion step, in order to disperse the pigment in the water phase, for example, the pigment is stirred with a mixed medium of the organic solvent and the water by at least one of various types of dispersing devices. Besides ultrasonic waves, the pigment can be dispersed appropriately and selectively using a high-pressure homogenizer, an ultra high-pressure homogenizer, a high speed mill, a sand mill, a bead mill, and/or a roll mill. The pigment dispersion step in the phase inversion emulsification method described above is preferably performed using a mixing/stirring device to apply an appropriate shearing force so that the resin is brought into contact with the pigment and is allowed to be adhered to the surface thereof.

In addition, although the organic solvent used in the step of preparing the pigment dispersion liquid is not particularly limited, in consideration of easiness to finally remove the organic solvent, a low-boiling point organic solvent is preferable. For example, there may be mentioned a ketone-based organic solvent, such as acetone or methyl ethyl ketone, an ester-based organic solvent, such as ethyl acetate, an alcohol-based organic solvent, such as ethanol or isopropyl alcohol, or an aromatic hydrocarbon-based organic solvent, such as benzene.

In addition, when a resin having an acidic group such as a carboxy group is dissolved or dispersed in water, as described above, besides various types of inorganic alkalis, although various types of organic amines may also be used as a neutralizer, an inorganic alkali is preferably used.

When the resin and the pigment (that is, resin-coated pigment) are separated from the water phase, the organic solvent is removed from the pigment dispersion liquid having a water phase in which the resin-coated pigment is dispersed by a method such as heating, and in addition, methods, such as centrifugal separation, water washing, ultrafiltration, and/or pressurized filtration, may be appropriately and selectively performed.

Dye

In the ink jet ink composition to be used for the recording method according to this embodiment, as the colorant, a dye may also be used. The dye is not particularly limited, and for example, an acidic dye, a direct dye, a reactive dye, a basic dye, or a dispersive dye may be used. As the dye, for example, there may be mentioned C.I. Acid Yellow 17, 23, 42, 44, 79, or 142, C.I. Acid Red 52, 80, 82, 249, 254, or 289, C.I. Acid Blue 9, 45, or 249, C.I. Acid Black 1, 2, 24, or 94, C.I. Food Black 1 or 2, C.I. Direct Yellow 1, 12, 24, 33, 50, 55, 58, 86, 132, 142, 144, or 173, C.I. Direct Red 1, 4, 9, 80, 81, 132, 225, or 227, C.I. Direct Blue 1, 2, 15, 71, 86, 87, 98, 165, 199, or 202, C.I. Direct Black 19, 38, 51, 71, 154, 168, 171, or 195, C.I. Reactive Red 14, 32, 55, 79, 141, or 249, or C.I. Reactive Black 3, 4, or 35.

Although a content of the colorant may be appropriately adjusted in accordance with application, the content described above with respect to the total mass of the ink composition is preferably 0.1 to 17.0 percent by mass, more preferably 0.2 to 15.0 percent by mass, further preferably 1.0 to 10.0 percent by mass, and particularly preferably 2.0 to 5.0 percent by mass.

Other Components

The ink jet ink composition to be used for the recording method of this embodiment may contain a water-soluble low molecular weight organic compound, a surfactant, a water-dispersible resin, and other components. The water-soluble low molecular weight organic compound and the surfactant, each of which may be contained in the ink jet ink composition, are similar to those described in the above treatment liquid and may be used without any particular restriction as long as being usable in the ink jet ink composition.

Water-Dispersible Resin

The ink jet ink composition may contain a water-dispersible resin. When the ink jet ink composition contains a water-dispersible resin, the abrasion resistance preferably tends to be made more excellent.

As the water-dispersible resin, for example, there may be mentioned an acrylic-based resin, an urethane-based resin, a polyester-based resin, an olefin-based resin, a fluorene-based resin, a rosin-modified resin, a terpene-based resin, a polyamide-based resin, an epoxy-based resin, a vinyl chloride-based resin, or an ethylene-vinyl acetate-based resin. Although being handled in the form of an emulsion in many cases, the water-dispersible resin may also be in the form of a powder and may also be fully dissolved in water.

The acrylic-based resin is a generic name of a polymer obtained by polymerization using at least an acrylic-based monomer, such as (meth)acrylic acid or a (meth)acrylate ester, as one component, and for example, a resin obtained from an acrylic-based monomer or a copolymer between an acrylic-based monomer and a monomer other than that may be mentioned. For example, an acrylic vinyl-based resin which is a copolymer between an acrylic-based monomer and a vinyl-based monomer may be mentioned. Furthermore, for example, a copolymer with a vinyl-based monomer such as styrene may also be mentioned. As the acrylic-based monomer, for example, acrylamide or acrylonitrile may also be used.

As a resin emulsion using an acrylic-based resin as a raw material, a commercially available product may also be selectively used, for example, from FK-854, Movinyl 952B, and 718A (trade name, manufactured by Japan Coating Resin Corporation); Nipol LX852 and LX874 (trade name, manufactured by Zeon Corporation); Polysol AT860 (manufactured by Showa Denko K.K.); and Boncoat AN-1190S, YG-651, AC-501, AN-1170, and 4001 (trade name, acrylic-based resin emulsion, manufactured by DIC Corporation).

In addition, in this specification, the acrylic-based resin may be a styrene-acrylic-based resin as described above. In addition, as described above, in this specification, "(meth)acryl" represents acryl and/or methacryl.

The styrene-acrylic-based resin is a copolymer obtained from a styrene monomer and an acrylic-based monomer, and for example, there may be mentioned a styrene-acrylic acid copolymer, a styrene-methacrylic acid copolymer, a styrene-methacrylic acid-acrylate ester copolymer, a styrene-α-methylstyrene-acrylic acid copolymer, or a styrene-α-methylstyrene-acrylic acid-acrylate ester copolymer. As the styrene-acrylic-based resin, a commercially available product may also be used, and for example, there may be mentioned Joncryl 62J, 7100, 390, 711, 511, 7001, 631, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); or Movinyl 966A or 975N (trade name, manufactured by Japan Coating Resin Corporation).

The urethane-based resin is a generic name of a resin having an urethane bond. As the urethane-based resin, for example, a polyether type urethane resin having an ether bond in its main chain besides the urethane bond, a polyester type urethane resin having an ester bond in its main chain besides the urethane bond, or a polycarbonate type urethane resin having a carbonate bond in its main chain besides the urethane bond may be used. In addition, as the urethane-based resin, a commercially available product may also be used and may be selected, for example, from Superflex 210, 460, 460s, 840, and E-4000 (trade name, manufactured by DKS Co., Ltd.); Resamine D-1060, D-2020, D-4080, D-4200, D-6300, and D-6455 (trade name, manufactured by Dainichiseika Color & Chemicals Mfg. Co., Ltd.); Takelac WS-6020, WS-6021 and W-512-A-6 (trade name, manufactured by Mitsui Chemicals Polyurethanes Inc.); Suncure 2710 (trade name, manufactured by Lubrizol); and Permarin UA-150 (trade name, manufactured by Sanyo Chemical Industries, Ltd.).

Although the polyester-based resin is not particularly limited, for example, a poly(ethylene terephthalate) may be mentioned. As the polyester-based resin, a commercially available product may also be used, and for example, Elitel KT8701 (trade name, manufactured by Unitika Ltd.) may be mentioned.

As the olefin-based resin, for example, a resin manufactured from an olefin, such as ethylene, propylene, or butylene, or its derivative may be mentioned, and in particular, a polyethylene-based resin, a polypropylene-based resin, or a polybutylene-based resin may be mentioned.

As a commercially available product of the olefin-based resin, for example, there may be mentioned AQUACER Series, such as AQUACER513 (polyethylene-based resin, average particle diameter: 100 to 200 nm, melting point: 130° C., solid content: 30%), AQUACER507, AQUACER515, AQUACER840, or AQUACER1547 (trade name, manufactured by BYK Japan KK); Hitec Series, such as Hitec E-7025P, Hitec E-2213, Hitec E-6500, Hitec E-6314, Hitec E-9460, Hitec E-9015, Hitec E-4A, Hitec E-5403P, or Hitec E-8237 (trade name, polyethylene-based resin, manufactured by Toho Chemical Industry Co., Ltd.); or Nopcoat PEM-17 (trade name, polyethylene emulsion, average particle diameter: 40 nm, manufactured by San Nopco Ltd.).

In addition, the water-dispersible resin is preferably supplied in the form of an emulsion, and as an example of a commercially available product of the resin emulsion as described above, there may be selectively used Microgel E-1002 or E-5002 (trade name, styrene-acrylic-based resin emulsion, manufactured by Nippon Paint Co., Ltd.); Boncoat AN-1190S, YG-651, AC-501, AN-1170, 4001, or 5454 (trade name, styrene-acrylic-based resin emulsion, manufactured by DIC Corporation); Polysol AM-710, AM-920, AM-2300, AP-4735, AT-860, or PSASE-4210E (acrylic-based resin emulsion), Polysol AP-7020 (styrene-acrylic resin emulsion), Polysol SH-502 (vinyl acetate resin emulsion), Polysol AD-13, AD-2, AD-10, AD-96, AD-17, or AD-70 (ethylene-vinyl acetate resin emulsion), or Polysol PSASE-6010 (ethylene-vinyl acetate resin emulsion) (trade name, manufactured by Showa Denko K.K.); Polysol SAE1014 (trade name, styrene-acrylic-based resin emulsion, manufactured by Zeon Corporation); Saivinol SK-200 (trade name, acrylic-based resin emulsion, manufactured by Saiden Chemical Industry Co., Ltd.); AE-120A (trade name, acrylic resin emulsion, manufactured by JSR Corporation); AE373D (trade name, carboxy-modified styrene-acrylic resin emulsion, manufactured by Emulsion Technology Co., Ltd.); Seikadyne 1900W (trade name, ethylene-vinyl acetate resin emulsion, manufactured by Dainichiseika Color & Chemicals Mfg. Co., Ltd.); Vinyblan 2682 (acrylic resin emulsion), Vinyblan 2886 (vinyl acetate-acrylic resin emulsion), Vinylblan 5202 (acrylic acetate resin emulsion), Vinyblan 700, or Vinyblan 2586 (trade name, manufactured by Nisshin Chemical Industry Co., Ltd.); Elitel KA-5071S, KT-8803, KT-9204, KT-8701, KT-8904, or KT-0507 (trade name, polyester resin emulsion, manufactured by Unitika Ltd.); Hitech SN-2002 (trade name, polyester resin emulsion, manufactured by Toho Chemical Industry Co., Ltd.); Takelac W-6020, W-635, W-6061, W-605, W-635, or W-6021 (trade name, urethane-based resin emulsion, manufactured by Mitsui Chemicals & Polyurethanes Inc.); Superflex 870, 800, 150, 420, 460, 470, 610, 620, or 700 (trade name, urethane-based resin emulsion, manufactured by DKS Co., Ltd.); Permarin UA-150 (urethane-based resin emulsion, manufactured by Sanyo Chemical Industries, Ltd.); Suncure 2710 (urethane-based resin emulsion, manufactured by Nippon Lubrizol); NeoRez R-9660, R-9637, or R-940 (urethane-based resin emulsion, manufactured by Kusumoto Chemicals, Ltd.); Adeka Bontigher HUX-380 or 290K (urethane-based resin emulsion, manufactured by ADEKA Corporation); Movinyl 966A or Movinyl 7320 (manufactured by Japan Coating Resin Corporation); Joncryl 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (manufactured by BASF); NK Binder R-5HN (manufactured by Shin-Nakamura Chemical Co., Ltd.); or Hydran WLS-210 (non-crosslinked polyurethane, manufactured by DIC Corporation).

The water-dispersible resin may be used alone, or at least two types thereof may be used in combination.

In the ink jet ink composition according to this embodiment, at least one water-dispersible resin selected from the acrylic-based resin, the urethane-based resin, the polyester-based resin, and the olefin-based resin is more preferable, and at least one selected from the acrylic-based resin and the olefin-based resin is further preferable. When the water-dispersible resin is a resin selected from those mentioned above, the abrasion resistance tends to be made particularly excellent.

In addition, since the ink jet ink composition described above is likely to be formed into a film on a recording medium, and the film thus formed has a more excellent abrasion resistance due to its excellent adhesion thereto, a glass transition temperature (Tg) of the water-dispersible resin is preferably 150° C. or less and more preferably 120° C. or less. In addition, since the abrasion resistance is made more excellent due to a certain hardness, and since a blocking resistance (bleed-through resistance) is made more excellent, the glass transition temperature described above is preferably −50° C. or more, more preferably 0° C. or more, and further preferably 20° C. or more. In addition, the glass transition temperature (Tg) can be confirmed by a known method using a differential scanning calorimetry (DSC) or the like.

A content of the water-dispersible resin on a solid content basis with respect to the total mass of the ink composition is preferably 0.1 to 20 percent by mass, more preferably 1.0 to 15.0 percent by mass, further preferably 2.0 to 10.0 percent by mass, and particularly preferably 3.0 to 8.0 percent by mass. When the content of the water-dispersible resin is in the range described above, the abrasion resistance tends to be made more excellent.

Other Components

As components other than those described above, various types of additives, such as a defoaming agent, a solubilizing agent, a viscosity adjuster, a pH adjuster, an antioxidant, an antiseptic agent, a fungicide, a corrosion inhibitor, and/or a chelating agent to trap metal ions imparting adverse influence on the dispersion, may be appropriately added to the ink jet ink composition according to this embodiment.

The pH of the ink jet ink composition can be adjusted by selection of the components, such as the pH adjuster, described above and/or by adjustment of blending amounts thereof. Although being not particularly limited, the pH of the ink jet ink composition is more preferably set to be higher than the pH of the treatment liquid by 1.5 or more. The difference in pH between the ink jet ink composition and the treatment liquid may be set by adjusting the pH of the treatment liquid or the pH of the ink jet ink composition.

The pH of the ink jet ink composition is preferably, for example, 7 to 10 and more preferably 7.5 to 9.5.

Manufacturing Method

The ink jet ink composition can be obtained such that for example, the components described above are mixed together in an arbitrary order, and impurities are then removed by filtration of the like, if needed. As a mixing method of each component, a method in which materials are sequentially added to a container equipped with a stirring device, such as a mechanical stirrer or a magnetic stirrer, and are then stirred and mixed together may be preferably used. As a filtration method, for example, centrifugal filtration or filter filtration may be performed, if needed.

Physical Properties

In consideration of the balance between the image quality and the reliability as an ink jet recording ink, the ink jet ink composition has a surface tension at 20° C. of preferably 18 to 40 mN/m, more preferably 20 to 35 mN/m, and further preferably 22 to 33 mN/m. Measurement of the surface tension may be performed such that by using an automatic surface tensiometer CBVP-Z (trade name, manufactured by Kyowa Interface Science Co., Ltd.), a surface tension at which a platinum plate is wetted with the ink in an environment at 20° C. is confirmed.

In addition, from the consideration similar to that described above, a viscosity of the ink jet ink composition according to this embodiment at 20° C. is preferably 3 to 10 mPa·s and more preferably 3 to 8 mPa·s. In addition, measurement of the viscosity may be performed such that by using an viscoelastic tester MCR-300 (trade name, manufactured by Pysica) or the like, a viscosity in an environment at 20° C. is measured.

2.4. Other Steps

The recording method of this embodiment may also include, besides the treatment liquid adhesion step and the ink adhesion step, the following steps.

2.4.1. Primary Drying Step

The recording method according to this embodiment may further include a primary drying step. Since the step as described above is included, at an early stage in which the ink jet ink composition is adhered to the recording medium, the drying property of the ink can be improved, and an excellent image quality is likely to be obtained.

The primary drying step is a step to dry the ink at an early stage in which the ink jet ink composition is adhered to the recording medium. The primary drying step is a drying step to dry at least part of the solvent component of the ink so that the fluidity of the ink adhered to the recording medium is at least decreased.

As a method of the primary drying step, for example, there may be mentioned a method to perform ventilation at ordinary temperature (ordinary temperature wind) or ventilation with heating (hot wind) to a recording medium by a fan or the like; a radiation method using an IR heater or microwaves; a method to heat a recording medium by a platen heater or the like; and a method to be performed in combination of the methods described above. In addition, in the primary drying step according to this embodiment, the method described above is not particularly limited as long as being capable of improving the drying property of the ink, and it should be noted that heating is not always required. Hence, in the primary drying step of this embodiment, the method to perform ventilation at ordinary temperature may be used alone. In addition, the primary drying step is more preferably performed by a method to be performed with heating.

When the ventilation is performed as the primary drying step, a ventilation wind speed is preferably 0.5 to 10 m/s, more preferably 1 to 5 m/s, and further preferably 2 to 3 m/s. The wind speed is a wind speed in the vicinity of the surface of the recording medium. When the wind speed is in the range described above or higher than that, for example, the image quality is preferably made more excellent, and dew condensation on the head is preferably further suppressed. When the wind speed is in the range described above or lower than that, for example, a clogging recovery property is preferably made more excellent. A ventilation wind temperature is preferably 50° C. or less, preferably 10° C. or more, even more preferably 15° C. to 45° C., and further preferably 20° C. to 49° C. The ventilation wind temperature may also be ordinary temperature.

When the primary drying step is performed with heating, the primary drying step may be performed such that the ink is adhered to a heated recording medium or the heating is performed at an early stage after the ink is adhered to the recording medium. In the primary drying step, the heating is preferably started within 0.5 seconds at the latest after ink droplets are landed on the recording medium.

When the primary drying step is performed with heating, the heating may be performed before the ink adhesion step, at the same time as that of the ink adhesion, or at an early stage after the ink adhesion step and is preferably performed at the same time as that of the ink adhesion. By the heating order as described above, the ink adhesion step can be performed.

In addition, when the primary drying step is performed with heating, the heating in this step may be preferably performed in the temperature range described as the surface temperature of the recording medium in the above ink adhesion step. In addition, when the ink is adhered to the heated recording medium, the heating temperature in the primary drying step is the surface temperature of the recording medium when the ink is adhered thereto, and when the heating is performed at an early stage after the ink adhesion, the heating temperature in the primary drying step is the surface temperature of the recording medium when the heating is performed. In addition, the surface temperature described above is the maximum temperature during the heating in the primary drying step.

2.4.2. Post-Heating Step

The recording method according to this embodiment may further include a post-heating step of heating the recording medium to which the above ink jet ink composition is adhered so that a recording medium surface has a temperature of 60° C. to 120° C. and preferably 80° C. to 110° C. after passing through the platen. Accordingly, the drying property is further improved, and a recorded matter more excellent in abrasion resistance preferably tends to be obtained.

The post-heating step is a step to complete the recording and to sufficiently dry the recorded matter so as to be ready for use. The post-drying step is a drying step to sufficiently dry the solvent component of the ink and to form a film from a coating film of the ink by heating the resin or the like to be contained therein.

After a certain point of the recording medium to which the ink is adhered in the above ink adhesion step passes through the platen, the post-heating step is preferably started on the surface of the recording medium including the certain point described above. For example, in the ink jet recording apparatus 1 shown in FIGS. 1 and 2, after the ink is adhered to a certain point of a recording medium M by the ink jet head 2 facing a platen 11, and the certain point of the recording medium M to which the ink is adhered passes through the platen 11, the post-heating step is started by a heating heater 5 on the surface of the recording medium M including the certain point described above.

In addition, for example, when the ink jet recording apparatus is used, the heating of the recording medium in the post-heating step may be performed using an appropriate heating device. In addition, besides the heating device equipped in the ink jet recording apparatus, the heating may also be performed by an appropriate heating device.

In the post-heating step, a lower limit of the surface temperature of the recording medium is preferably 50° C. or more, more preferably 60° C. or more, even more preferably 70° C. or more, and further preferably 75° C. or more. An upper limit of the surface temperature of the recording medium is preferably 120° C. or less, more preferably 110° C. or less, even more preferably 100° C. or less, and further preferably 90° C. or less.

In addition, a preferable temperature in the primary drying step and a preferable temperature in the post-heating step are preferably different from each other.

2.5. Ink Jet Recording Apparatus

One example of an ink jet recording apparatus which can be used for the recording method according to this embodiment will be described with reference to the drawings.

Figure 2:
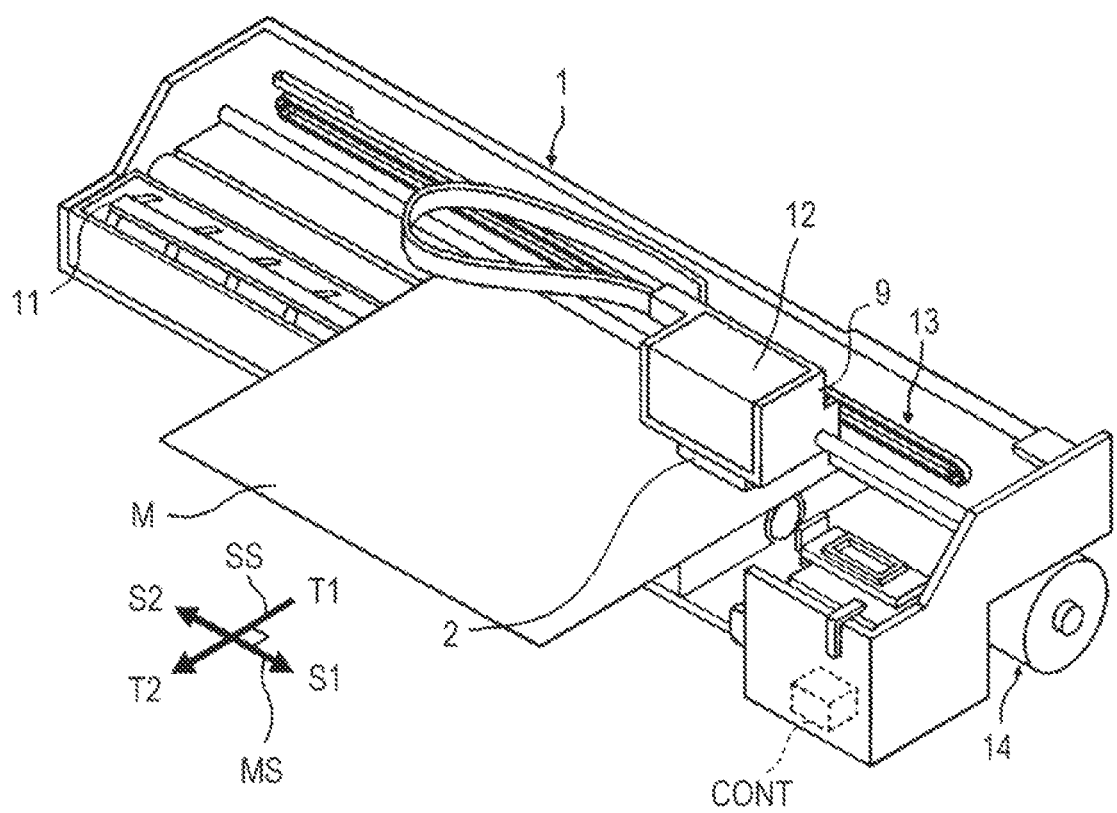
FIG. 2 is a schematic view of a carriage and its periphery of the example of the ink jet recording apparatus.

FIG. 1 is a cross-sectional view schematically showing the ink jet recording apparatus 1. FIG. 2 is a perspective view showing one example of the structure of a carriage and its vicinity of the ink jet recording apparatus 1 shown in FIG. 1. As shown in FIGS. 1 and 2, the ink jet recording apparatus 1 includes the ink jet head 2, an IR heater 3, a platen heater 4, the heating heater 5, a cooling fan 6, a pre-heater 7, a ventilation fan 8, a carriage 9, the platen 11, a carriage transfer mechanism 13, a transport device 14, and a control portion CONT. In the ink jet recording apparatus 1, all operations thereof are controlled by the control portion CONT shown in FIG. 2.

The ink jet head 2 has a structure to perform recording on the recording medium M by ejecting a treatment liquid and an ink jet ink composition from nozzles of the ink jet head 2 so as to be adhered thereto. In this embodiment, the ink jet head 2 is a serial type ink jet head and is configured to adhere the ink to the recording medium M by a plurality of scannings performed in a main scanning direction relative to the recording medium M. The ink jet head 2 is mounted on the carriage 9 shown in FIG. 2. The ink jet head 2 is scanned a plurality of times in the main scanning direction relative to the recording medium M by the operation of the carriage transfer mechanism 13 to transfer the carriage 9 in a medium width direction of the recording medium M. The medium width direction is the main scanning direction of the ink jet head 2. The scanning in the main scanning direction is also called a main scanning.

In addition, the main scanning direction is a direction in which the carriage 9 mounting the ink jet head 2 is transferred. In FIG. 1, the main scanning direction is a direction intersecting a sub-scanning direction which is a transport direction of the recording medium M shown by an arrow SS. In FIG. 2, the width direction of the recording medium M, that is, a direction represented by S1-S2, is a main scanning direction MS, and a direction represented by T1→T2 is a sub-scanning direction SS. In addition, by one scanning, the scanning is performed in the main scanning direction, that is, in one direction represented by an arrow S1 or an arrow S2. In addition, since the main scanning of the ink jet head 2 and the sub-scanning which is the transport of the recording medium M are repeatedly performed at least two times, the ink is recorded on the recording medium M. That is, the treatment liquid adhesion step and the ink adhesion step are performed by a plurality of main scannings in each of which the ink jet head 2 is transferred in the main scanning direction and by a plurality of sub-scannings in each of which the recording medium M is transported in the sub-scanning direction intersecting the main scanning direction.

The cartridge 12 to supply the ink jet ink composition and the treatment liquid to the ink jet head 2 includes a plurality of independent cartridges. The cartridge 12 is detachably fitted to the carriage 9 mounting the ink jet head 2. In the respective cartridges, different types of ink jet ink compositions and the treatment liquid are filled, and the ink jet ink compositions and the treatment liquid are supplied to respective nozzles from the cartridge 12. In addition, in this embodiment, although the case in which the cartridge 12 is fitted to the carriage 9 is shown by way of example, the cartridge 12 is not limited thereto and may be provided at a position other than that of the carriage 9 so that the ink jet ink compositions and the treatment liquid are each supplied to the nozzle by a supply tube not shown.

For the ejection by the ink jet head 2, a known method may be used. In this embodiment, a method to eject a liquid droplet using vibration of a piezoelectric element, that is, an ejection method to form an ink droplet by a mechanical deformation of an electrostrictive element, is used.

The ink jet recording apparatus 1 includes the ventilation fan 8, the IR heater 3, and the platen heater 4 each of which is used to dry the ink jet ink composition ejected from the ink jet head 2 and adhered to the recording medium M. By appropriately using the ventilation fan 8, the IR heater 3, and the platen heater 4 in combination, the primary drying step can be performed. Furthermore, in the primary drying step, the recording medium M is not always required to be heated, and for example, the ventilation fan 8 may only be used to perform ventilation at ordinary temperature.

In addition, when the IR heater 3 is used, the recording medium M can be heated using a radiation method to radiate infrared rays from an ink jet head 2 side. Accordingly, although the ink jet head 2 is also liable to be simultaneously heated, compared to the case in which heating is performed from a rear surface of the recording medium M by the platen heater 4 or the like, the temperature can be increased without receiving the influence of the thickness of the recording medium M. In addition, there may be also provided various types of fans (such as the ventilation fan 8) to dry the ink on the recording medium M by supplying a hot wind or a wind having the same temperature as that in the environment to the recording medium M.

In order to perform drying at an early stage after the treatment liquid or the ink jet ink composition ejected from the ink jet head 2 is adhered to the recording medium M, the platen heater 4 is configured to be able to heat the recording medium M at a position facing the ink jet head 2 with the platen 11 interposed therebetween. The platen heater 4 is able to heat the recording medium M by a conduction method, and in the recording method of this embodiment, the ink jet ink composition can be adhered to the recording medium M thus heated as described above. Hence, the ink jet ink composition can be fixed on the recording medium M at an early stage, and the image quality can be improved.

The heating heater 5 dries and solidifies the treatment liquid or the ink jet ink composition adhered to the recording medium M, that is, the heating heater 5 is a secondary heating heater or a secondary drying heater. The heating heater 5 can be used in the post-drying step. Since the heating heater 5 heats the recording medium M on which an image is recorded, for example, moisture contained in the ink jet ink composition is more rapidly evaporated and scattered, and an ink film is formed by the resin to be contained in the ink jet ink composition. As described above, the ink film is tightly fixed or adhered onto the recording medium M so as to have an excellent film forming property, and hence, an image having an excellent high image quality can be obtained in a short time.

The ink jet recording apparatus 1 may also include the cooling fan 6. After the ink jet ink composition recorded on the recording medium M is dried, when the ink jet ink composition on the recording medium M is cooled by the cooling fan 6, an ink coating film can be formed so as to have an excellent adhesion onto the recording medium M.

In addition, the ink jet recording apparatus 1 may also include the pre-heater 7 to heat the recording medium M in advance before the ink jet ink composition is adhered to the recording medium M. Furthermore, the ink jet recording apparatus 1 may also include the ventilation fan 8 so as to more efficiently dry the ink jet ink composition adhered to the recording medium M.

At a lower side of the carriage 9, there are provided the platen 11 to support the recording medium M, the carriage transfer mechanism 13 to transfer the carriage 9 relative to the recording medium M, and the transport device 14 which is a roller to transport the recording medium M in the sub-scanning direction. The operations of the carriage transfer mechanism 13 and the transport device 14 are controlled by the control portion CONT.

In FIGS. 1 and 2, although the serial type ink jet recording apparatus is shown, a line type ink jet recording apparatus may also be used.

The ink jet recording apparatus described above by way of example can be preferably used to perform the recording method according to this embodiment.

2.6. Operational Effect

According to this recording method, since the treatment liquid containing at least one selected from an organic acid polyvalent metal salt and a cationic polymer and an organic acid is used, the aggregation ability is not only made preferable, but the drying property is also made preferable, and the image quality and the abrasion resistance of the image formed by the water-based ink jet ink composition containing a colorant can be made preferable.

3. Examples and Comparative Examples

Hereinafter, although the present disclosure will be described in more detail with reference to Examples, the present disclosure is not limited thereto. Hereinafter, "%" is on mass basis unless otherwise particularly noted.

3.1. Preparation of Treatment Liquid

After components were charged into a container to have one of the compositions shown in the following Tables 1 to 4 and were then mixed and stirred together for 2 hours using a magnetic stirrer, filtration was performed using a membrane filter having a pore diameter of 5 m, so that treatment liquids to be used for Examples and Comparative Examples were obtained. The numerical values in the following Tables 1 to 4 each represent percent by mass, and pure water was added so that a total mass of the treatment liquid was 100 percent by mass.

TABLE 1

| | | | TREATMENT LIQUID 1 | TREATMENT LIQUID 2 | TREATMENT LIQUID 3 | TREATMENT LIQUID 4 |
|---|---|---|---|---|---|---|
| ORGANIC ACID | DICARBOXYLIC ACID | ADIPIC ACID (bp 338° C.) | 0.003 | 0.030 | 0.003 | — |
| | | SUCCINIC ACID (bp 235° C.) | — | — | — | 0.003 |
| | MONOCARBOXYLIC ACID | PROPIONIC ACID (bp 141° C.) | — | — | — | — |
| | HYDROXY ACID | LACTIC ACID (bp 217° C.) | — | — | — | — |
| ORGANIC ACID POLYVALENT METAL SALT | ORGANIC ACID DIVALENT METAL SALT | CALCIUM FORMATE | 3.0 | 3.0 | 8.0 | 3.0 |
| | | CALCIUM ACETATE | — | — | — | — |
| | | CALCIUM PROPIONATE | — | — | — | — |
| | | CALCIUM LACTATE | — | — | — | — |
| | | MAGNESIUM ACETATE | — | — | — | — |
| CATIONIC POLYMER | AMINE/EPICHLOROHYDRIN COPOLYMER | CATIONMASTER PD-7 (EFFECTIVE COMPONENT) | — | — | — | — |
| | POLYETHYLENEIMINE | Lupasol FG (EFFECTIVE COMPONENT) | — | — | — | — |
| OTHER METAL SALT | INORGANIC ACID DIVALENT METAL SALT | CALCIUM CHLORIDE | — | — | — | — |
| | ORGANIC ACID MONOVALENT METAL SALT | SODIUM ACETATE | — | — | — | — |
| WATER-SOLUBLE LOW MOLECULAR WEIGHT ORGANIC COMPOUND (BP: 250° C. OR LESS) | ALKANEDIOL (BP: 210° C. OR LESS) | PG (bp 188° C.) | 15.0 | 15.0 | 15.0 | 15.0 |
| | | 1,3BG (bp 207° C.) | — | — | — | — |
| | ALKYLENE GLYCOL MONOETHER (BP: 210° C. OR LESS) | MB (bp 158° C.) | 5.0 | 5.0 | 5.0 | 5.0 |
| | | PM (bp 120° C.) | — | — | — | — |
| | | DPM (bp 190° C.) | — | — | — | — |
| | AMIDE | 2P (bp 245° C.) | — | — | — | — |
| | SULFUR-CONTAINING SOLVENT | DMSO (bp 188° C.) | — | — | — | — |
| | CYCLIC ETHER | EOXM (bp 220° C.) | — | — | — | — |
| | ALKANEDIOL (BP: 210° C. TO 250° C.) | 1,2HD (bp 224° C.) | 1.0 | 1.0 | 1.0 | 1.0 |

TABLE 1-continued

| | | | | | | |
|---|---|---|---|---|---|---|
| WATER-SOLUBLE LOW MOLECULAR WEIGHT ORGANIC COMPOUND (BP: MORE THAN 250° C.) | AMIDE | CPL (bp 267° C.) | 2.0 | 2.0 | 2.0 | 2.0 |
| SURFACTANT | SILICONE BASE | BYK-349 | 0.5 | 0.5 | 0.5 | 0.5 |
| | ACETYLENE BASE | SURFYNOL DF110D | 0.1 | 0.1 | 0.1 | 0.1 |
| | PURE WATER | | BALANCE | BALANCE | BALANCE | BALANCE |
| | TOTAL | | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS | | | 21.0 | 21.0 | 21.0 | 21.0 |
| TOTAL OF AMIDE, SULFUR-CONTAINING SOLVENT, AND CYCLIC ETHER | | | 2.0 | 2.0 | 2.0 | 2.0 |
| pH | | | 6.8 | 5.9 | 7.2 | 7 |
| DIFFERENCE IN pH (TO INK) | | | −2.2 | −3.1 | −1.8 | −2 |
| EVALUATION | MEMBER RELIABILITY | | A | B | A | A |

| | | | TREAT-MENT LIQUID 5 | TREAT-MENT LIQUID 6 | TREAT-MENT LIQUID 7 | TREAT-MENT LIQUID 8 |
|---|---|---|---|---|---|---|
| ORGANIC ACID | DICARBOXYLIC ACID | ADIPIC ACID (bp 338° C.) | — | — | 0.030 | 0.060 |
| | | SUCCINIC ACID (bp 235° C.) | — | — | — | — |
| | MONOCARBOXYLIC ACID | PROPIONIC ACID (bp 141° C.) | 0.003 | — | — | — |
| | HYDROXY ACID | LACTIC ACID (bp 217° C.) | — | 0.003 | — | — |
| ORGANIC ACID | ORGANIC ACID | CALCIUM FORMATE | 3.0 | 3.0 | — | — |
| POLYVALENT METAL SALT | DIVALENT METAL SALT | CALCIUM ACETATE | — | — | 3.0 | — |
| | | CALCIUM PROPIONATE | — | — | — | 3.0 |
| | | CALCIUM LACTATE | — | — | — | — |
| | | MAGNESIUM ACETATE | — | — | — | — |
| CATIONIC POLYMER | AMINE/EPICHLOROHYDRIN COPOLYMER | CATIONMASTER PD-7 (EFFECTIVE COMPONENT) | — | — | — | — |
| | POLYETHYLENEIMINE | Lupasol FG (EFFECTIVE COMPONENT) | | | | |
| OTHER METAL SALT | INORGANIC ACID DIVALENT METAL SALT | CALCIUM CHLORIDE | — | — | — | — |
| | ORGANIC ACID MONOVALENT METAL SALT | SODIUM ACETATE | — | — | — | — |
| WATER-SOLUBLE LOW MOLECULAR WEIGHT ORGANIC COMPOUND (BP: 250° C. OR LESS) | ALKANEDIOL (BP: 210° C. OR LESS) | PG (bp 188° C.) | 15.0 | 15.0 | 15.0 | 15.0 |
| | | 1,3BG (bp 207° C.) | — | — | — | — |
| | ALKYLENE GLYCOL MONOETHER (BP: 210° C. OR LESS) | MB (bp 158° C.) | 5.0 | 5.0 | 5.0 | 5.0 |
| | | PM (bp 120° C.) | — | — | — | — |
| | | DPM (bp 190° C.) | — | — | — | — |
| | AMIDE | 2P (bp 245° C.) | — | — | — | — |
| | SULFUR-CONTAINING SOLVENT | DMSO (bp 188° C.) | — | — | — | — |
| | CYCLIC ETHER | EOXM (bp 220° C.) | — | — | — | — |
| | ALKANEDIOL (BP: 210° C. TO 250° C.) | 1,2HD (bp 224° C.) | 1.0 | 1.0 | 1.0 | 1.0 |
| WATER-SOLUBLE LOW MOLECULAR WEIGHT ORGANIC COMPOUND (BP: MORE THAN 250° C.) | AMIDE | CPL (bp 267° C.) | 2.0 | 2.0 | 2.0 | 2.0 |
| SURFACTANT | SILICONE BASE | BYK-349 | 0.5 | 0.5 | 0.5 | 0.5 |
| | ACETYLENE BASE | SURFYNOL DF110D | 0.1 | 0.1 | 0.1 | 0.1 |
| | PURE WATER | | BALANCE | BALANCE | BALANCE | BALANCE |
| | TOTAL | | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS | | | 21.0 | 21.0 | 21.0 | 21.0 |
| TOTAL OF AMIDE, SULFUR-CONTAINING SOLVENT, AND CYCLIC ETHER | | | 2.0 | 2.0 | 2.0 | 2.0 |
| pH | | | 6.8 | 7.2 | 6.9 | 7 |
| DIFFERENCE IN pH (TO INK) | | | −2.2 | −1.8 | −2.1 | −2 |
| EVALUATION | MEMBER RELIABILITY | | A | A | A | A |

TABLE 2

| | | | TREATMENT LIQUID 9 | TREATMENT LIQUID 10 | TREATMENT LIQUID 11 | TREATMENT LIQUID 12 |
|---|---|---|---|---|---|---|
| ORGANIC ACID | DICARBOXYLIC ACID | ADIPIC ACID (bp 338° C.) | 0.003 | 0.030 | 0.030 | 2.400 |
| | | SUCCINIC ACID (bp 235° C.) | — | — | — | — |
| | MONOCARBOXYLIC ACID | PROPIONIC ACID (bp 141° C.) | — | — | — | — |
| | HYDROXY ACID | LACTIC ACID (bp 217° C.) | — | — | — | — |
| ORGANIC ACID POLYVALENT METAL SALT | ORGANIC ACID DIVALENT METAL SALT | CALCIUM FORMATE | — | — | — | — |
| | | CALCIUM ACETATE | — | — | — | — |
| | | CALCIUM PROPIONATE | — | — | — | — |
| | | CALCIUM LACTATE | 3.0 | — | — | — |
| | | MAGNESIUM ACETATE | — | 3.0 | — | — |
| CATIONIC POLYMER | AMINE/ EPICHLOROHYDRIN COPOLYMER | CATIONMASTER PD-7 (EFFECTIVE COMPONENT) | — | — | 2.0 | — |
| | POLYETHYLENEIMINE | Lupasol FG (EFFECTIVE COMPONENT) | — | — | — | 2.0 |
| OTHER METAL SALT | INORGANIC ACID DIVALENT METAL SALT | CALCIUM CHLORIDE | — | — | — | — |
| | ORGANIC ACID MONOVALENT METAL SALT | SODIUM ACETATE | — | — | — | — |
| WATER-SOLUBLE LOW MOLECULAR WEIGHT ORGANIC COMPOUND (BP: 250° C. OR LESS) | ALKANEDIOL (BP: 210° C. OR LESS) | PG (bp 188° C.) | 15.0 | 15.0 | 15.0 | 15.0 |
| | | 1,3BG (bp 207° C.) | — | — | — | — |
| | ALKYLENE GLYCOL MONOETHER (BP: 210° C. OR LESS) | MB (bp 158° C.) | 5.0 | 5.0 | 5.0 | 5.0 |
| | | PM (bp 120° C.) | — | — | — | — |
| | | DPM (bp 190° C.) | — | — | — | — |
| | AMIDE | 2P (bp 245° C.) | — | — | — | — |
| | SULFUR-CONTAINING SOLVENT | DMSO (bp 188° C.) | — | — | — | — |
| | CYCLIC ETHER | EOXM (bp 220° C.) | — | — | — | — |
| | ALKANEDIOL (BP: 210° C. TO 250° C.) | 1,2HD (bp 224° C.) | 1.0 | 1.0 | 1.0 | 1.0 |
| WATER-SOLUBLE LOW MOLECULAR WEIGHT ORGANIC COMPOUND (BP: MORE THAN 250° C.) | AMIDE | CPL (bp 267° C.) | 2.0 | 2.0 | 2.0 | 2.0 |
| SURFACTANT | SILICONE BASE | BYK-349 | 0.5 | 0.5 | 0.5 | 0.5 |
| | ACETYLENE BASE | SURFYNOL DF110D | 0.1 | 0.1 | 0.1 | 0.1 |
| | PURE WATER | | BALANCE | BALANCE | BALANCE | BALANCE |
| | TOTAL | | 100 | 100 | 100 | 100 |
| | TOTAL OF WATER-SOLUBLE LOW MOLECULAR WEIGHT ORGANIC COMPOUND HAVING STANDARD BOILING POINT OF 250° C. OR LESS | | 21.0 | 21.0 | 21.0 | 21.0 |
| | TOTAL OF AMIDE, SULFUR-CONTAINING SOLVENT, AND CYCLIC ETHER | | 2.0 | 2.0 | 2.0 | 2.0 |
| | pH | | 6.7 | 6.8 | 7 | 7.3 |
| | DIFFERENCE IN pH (TO INK) | | −2.3 | −2.2 | −2 | −1.7 |
| EVALUATION | MEMBER RELIABILITY | | A | A | A | A |

| | | | TREATMENT LIQUID 13 | TREATMENT LIQUID 14 | TREATMENT LIQUID 15 | TREATMENT LIQUID 16 |
|---|---|---|---|---|---|---|
| ORGANIC ACID | DICARBOXYLIC ACID | ADIPIC ACID (bp 338° C.) | 0.003 | 0.003 | 0.003 | 0.003 |
| | | SUCCINIC ACID (bp 235° C.) | — | — | — | — |
| | MONOCARBOXYLIC ACID | PROPIONIC ACID (bp 141° C.) | — | — | — | — |
| | HYDROXY ACID | LACTIC ACID (bp 217° C.) | — | — | — | — |
| ORGANIC ACID POLYVALENT METAL SALT | ORGANIC ACID DIVALENT METAL SALT | CALCIUM FORMATE | 3.0 | 3.0 | 3.0 | 3.0 |
| | | CALCIUM ACETATE | — | — | — | — |
| | | CALCIUM PROPIONATE | — | — | — | — |
| | | CALCIUM LACTATE | — | — | — | — |
| | | MAGNESIUM ACETATE | — | — | — | — |
| CATIONIC POLYMER | AMINE/ EPICHLOROHYDRIN COPOLYMER | CATIONMASTER PD-7 (EFFECTIVE COMPONENT) | — | — | — | — |
| | POLYETHYLENEIMINE | Lupasol FG (EFFECTIVE COMPONENT) | — | — | — | — |
| OTHER METAL SALT | INORGANIC ACID DIVALENT METAL SALT | CALCIUM CHLORIDE | — | — | — | — |
| | ORGANIC ACID MONOVALENT METAL SALT | SODIUM ACETATE | — | — | — | — |

TABLE 2-continued

| | | | | | | |
|---|---|---|---|---|---|---|
| WATER-SOLUBLE LOW MOLECULAR WEIGHT ORGANIC COMPOUND (BP: 250° C. OR LESS) | ALKANEDIOL (BP: 210° C. OR LESS) | PG (bp 188° C.) | 20.0 | 5.0 | 20.0 | — |
| | | 1,3BG (bp 207° C.) | — | — | — | — |
| | ALKYLENE GLYCOL MONOETHER (BP: 210° C. OR LESS) | MB (bp 158° C.) | 5.0 | 5.0 | — | 20.0 |
| | | PM (bp 120° C.) | — | — | — | — |
| | | DPM (bp 190° C.) | — | — | — | — |
| | AMIDE | 2P (bp 245° C.) | — | — | — | — |
| | SULFUR-CONTAINING SOLVENT | DMSO (bp 188° C.) | — | — | — | — |
| | CYCLIC ETHER | EOXM (bp 220° C.) | — | — | — | — |
| | ALKANEDIOL (BP: 210° C. TO 250° C.) | 1,2HD (bp 224° C.) | 1.0 | 1.0 | 1.0 | 1.0 |
| WATER-SOLUBLE LOW MOLECULAR WEIGHT ORGANIC COMPOUND (BP: MORE THAN 250° C.) | AMIDE | CPL (bp 267° C.) | 2.0 | 2.0 | 2.0 | 2.0 |
| SURFACTANT | SILICONE BASE | BYK-349 | 0.5 | 0.5 | 0.5 | 0.5 |
| | ACETYLENE BASE | SURFYNOL DF110D | 0.1 | 0.1 | 0.1 | 0.1 |
| | PURE WATER | | BALANCE | BALANCE | BALANCE | BALANCE |
| | TOTAL | | 100 | 100 | 100 | 100 |
| | TOTAL OF WATER-SOLUBLE LOW MOLECULAR WEIGHT ORGANIC COMPOUND HAVING STANDARD BOILING POINT OF 250° C. OR LESS | | 26.0 | 11.0 | 21.0 | 21.0 |
| | TOTAL OF AMIDE, SULFUR-CONTAINING SOLVENT, AND CYCLIC ETHER | | 2.0 | 2.0 | 2.0 | 2.0 |
| | pH | | 6.8 | 6.8 | 6.8 | 6.8 |
| | DIFFERENCE IN pH (TO INK) | | -2.2 | -2.2 | -2.2 | -2.2 |
| EVALUATION | MEMBER RELIABILITY | | A | A | A | B |

TABLE 3

| | | | TREATMENT LIQUID 17 | TREATMENT LIQUID 18 | TREATMENT LIQUID 19 | TREATMENT LIQUID 20 |
|---|---|---|---|---|---|---|
| ORGANIC ACID | DICARBOXYLIC ACID | ADIPIC ACID (bp 338° C.) | 0.003 | 0.003 | 0.003 | 0.003 |
| | | SUCCINIC ACID (bp 235° C.) | — | — | — | — |
| | MONOCARBOXYLIC ACID | PROPIONIC ACID (bp 141° C.) | — | — | — | — |
| | HYDROXY ACID | LACTIC ACID (bp 217° C.) | — | — | — | — |
| ORGANIC ACID POLYVALENT METAL SALT | ORGANIC ACID DIVALENT METAL SALT | CALCIUM FORMATE | 3.0 | 3.0 | 3.0 | 3.0 |
| | | CALCIUM ACETATE | — | — | — | — |
| | | CALCIUM PROPIONATE | — | — | — | — |
| | | CALCIUM LACTATE | — | — | — | — |
| | | MAGNESIUM ACETATE | — | — | — | — |
| CATIONIC POLYMER | AMINE/EPICHLOROHYDRIN COPOLYMER | CATIONMASTER PD-7 (EFFECTIVE COMPONENT) | — | — | — | — |
| | POLYETHYLENEIMINE | Lupasol FG (EFFECTIVE COMPONENT) | — | — | — | — |
| OTHER METAL SALT | INORGANIC ACID DIVALENT METAL SALT | CALCIUM CHLORIDE | — | — | — | — |
| | ORGANIC ACID MONOVALENT METAL SALT | SODIUM ACETATE | — | — | — | — |
| WATER-SOLUBLE LOW MOLECULAR WEIGHT ORGANIC COMPOUND (BP: 250° C. OR LESS) | ALKANEDIOL (BP: 210° C. OR LESS) | PG (bp 188° C.) | — | 15.0 | 15.0 | 15.0 |
| | | 1,3BG (bp 207° C.) | 15.0 | — | — | — |
| | ALKYLENE GLYCOL MONOETHER (BP: 210° C. OR LESS) | MB (bp 158° C.) | 5.0 | — | — | 5.0 |
| | | PM (bp 120° C.) | — | 5.0 | — | — |
| | | DPM (bp 190° C.) | — | — | 5.0 | — |
| | AMIDE | 2P (bp 245° C.) | — | — | — | 2.0 |
| | SULFUR-CONTAINING SOLVENT | DMSO (bp 188° C.) | — | — | — | — |
| | CYCLIC ETHER | EOXM (bp 220° C.) | — | — | — | — |
| | ALKANEDIOL (BP: 210° C. TO 250° C.) | 1,2HD (bp 224° C.) | 1.0 | 1.0 | 1.0 | 1.0 |
| WATER-SOLUBLE LOW MOLECULAR WEIGHT ORGANIC COMPOUND (BP: MORE THAN 250° C.) | AMIDE | CPL (bp 267° C.) | 2.0 | 2.0 | 2.0 | — |

TABLE 3-continued

| | | | | | | |
|---|---|---|---|---|---|---|
| SURFACTANT | SILICONE BASE | BYK-349 | 0.5 | 0.5 | 0.5 | 0.5 |
| | ACETYLENE BASE | SURFYNOL DF110D | 0.1 | 0.1 | 0.1 | 0.1 |
| | PURE WATER | | BALANCE | BALANCE | BALANCE | BALANCE |
| | TOTAL | | 100 | 100 | 100 | 100 |
| | TOTAL OF WATER-SOLUBLE LOW MOLECULAR WEIGHT ORGANIC COMPOUND HAVING STANDARD BOILING POINT OF 250° C. OR LESS | | 21.0 | 21.0 | 21.0 | 23.0 |
| | TOTAL OF AMIDE, SULFUR-CONTAINING SOLVENT, AND CYCLIC ETHER | | 2.0 | 2.0 | 2.0 | 2.0 |
| | pH | | 6.8 | 6.8 | 6.8 | 6.8 |
| | DIFFERENCE IN pH (TO INK) | | −2.2 | −2.2 | −2.2 | −2.2 |
| EVALUATION | MEMBER RELIABILITY | | A | A | A | A |

| | | | TREAT-MENT LIQUID 21 | TREAT-MENT LIQUID 22 | TREAT-MENT LIQUID 23 | TREAT-MENT LIQUID 24 |
|---|---|---|---|---|---|---|
| ORGANIC ACID | DICARBOXYLIC ACID | ADIPIC ACID (bp 338° C.) | 0.003 | 0.003 | 0.003 | 0.003 |
| | | SUCCINIC ACID (bp 235° C.) | — | — | — | — |
| | MONOCARBOXYLIC ACID | PROPIONIC ACID (bp 141° C.) | — | — | — | — |
| | HYDROXY ACID | LACTIC ACID (bp 217° C.) | — | — | — | — |
| ORGANIC ACID POLYVALENT METAL SALT | ORGANIC ACID DIVALENT METAL SALT | CALCIUM FORMATE | 3.0 | 3.0 | 3.0 | 3.0 |
| | | CALCIUM ACETATE | — | — | — | — |
| | | CALCIUM PROPIONATE | — | — | — | — |
| | | CALCIUM LACTATE | — | — | — | — |
| | | MAGNESIUM ACETATE | — | — | — | — |
| CATIONIC POLYMER | AMINE/EPICHLOROHYDRIN COPOLYMER | CATIONMASTER PD-7 (EFFECTIVE COMPONENT) | — | — | — | — |
| | POLYETHYLENEIMINE | Lupasol FG (EFFECTIVE COMPONENT) | — | — | — | — |
| OTHER METAL SALT | INORGANIC ACID DIVALENT METAL SALT | CALCIUM CHLORIDE | — | — | — | — |
| | ORGANIC ACID MONOVALENT METAL SALT | SODIUM ACETATE | — | — | — | — |
| WATER-SOLUBLE LOW MOLECULAR WEIGHT ORGANIC COMPOUND (BP: 250° C. OR LESS) | ALKANEDIOL (BP: 210° C. OR LESS) | PG (bp 188° C.) | 15.0 | 15.0 | 15.0 | 15.0 |
| | | 1,3BG (bp 207° C.) | — | — | — | — |
| | ALKYLENE GLYCOL MONOETHER (BP: 210° C. OR LESS) | MB (bp 158° C.) | 5.0 | 5.0 | 5.0 | 5.0 |
| | | PM (bp 120° C.) | — | — | — | — |
| | | DPM (bp 190° C.) | — | — | — | — |
| | AMIDE | 2P (bp 245° C.) | — | — | — | — |
| | SULFUR-CONTAINING SOLVENT | DMSO (bp 188° C.) | 2.0 | — | — | — |
| | CYCLIC ETHER | EOXM (bp 220° C.) | — | 2.0 | — | — |
| | ALKANEDIOL (BP: 210° C. TO 250° C.) | 1,2HD (bp 224° C.) | 1.0 | 1.0 | 1.0 | 1.0 |
| WATER-SOLUBLE LOW MOLECULAR WEIGHT ORGANIC COMPOUND (BP: MORE THAN 250° C.) | AMIDE | CPL (bp 267° C.) | — | — | 8.0 | — |
| SURFACTANT | SILICONE BASE | BYK-349 | 0.5 | 0.5 | 0.5 | 0.5 |
| | ACETYLENE BASE | SURFYNOL DF110D | 0.1 | 0.1 | 0.1 | 0.1 |
| | PURE WATER | | BALANCE | BALANCE | BALANCE | BALANCE |
| | TOTAL | | 100 | 100 | 100 | 100 |
| | TOTAL OF WATER-SOLUBLE LOW MOLECULAR WEIGHT ORGANIC COMPOUND HAVING STANDARD BOILING POINT OF 250° C. OR LESS | | 23.0 | 23.0 | 21.0 | 21.0 |
| | TOTAL OF AMIDE, SULFUR-CONTAINING SOLVENT, AND CYCLIC ETHER | | 2.0 | 2.0 | 8.0 | — |
| | pH | | 6.8 | 6.8 | 6.8 | 6.8 |
| | DIFFERENCE IN pH (TO INK) | | −2.2 | −2.2 | −2.2 | −2.2 |
| EVALUATION | MEMBER RELIABILITY | | B | B | B | A |

TABLE 4

| | | | TREAT-MENT LIQUID 25 | TREAT-MENT LIQUID 26 | TREAT-MENT LIQUID 27 | TREAT-MENT LIQUID 28 |
|---|---|---|---|---|---|---|
| ORGANIC ACID | DICARBOXYLIC ACID | ADIPIC ACID (bp 338° C.) | 0.003 | — | 0.300 | 0.003 |
| | | SUCCINIC ACID (bp 235° C.) | — | — | — | — |
| | MONOCARBOXYLIC ACID | PROPIONIC ACID (bp 141° C.) | — | — | — | — |
| | HYDROXY ACID | LACTIC ACID (bp 217° C.) | — | — | — | — |
| | | CALCIUM FORMATE | 3.0 | 3.0 | 3.0 | — |

TABLE 4-continued

| | | | | | | |
|---|---|---|---|---|---|---|
| ORGANIC ACID POLYVALENT METAL SALT | ORGANIC ACID DIVALENT METAL SALT | CALCIUM ACETATE | — | — | — | — |
| | | CALCIUM PROPIONATE | — | — | — | — |
| | | CALCIUM LACTATE | — | — | — | — |
| | | MAGNESIUM ACETATE | — | — | — | — |
| CATIONIC POLYMER | AMINE/EPICHLOROHYDRIN COPOLYMER | CATIONMASTER PD-7 (EFFECTIVE COMPONENT) | — | — | — | — |
| | POLYETHYLENEIMINE | Lupasol FG (EFFECTIVE COMPONENT) | — | — | — | — |
| OTHER METAL SALT | INORGANIC ACID DIVALENT METAL SALT | CALCIUM CHLORIDE | — | — | — | — |
| | ORGANIC ACID MONOVALENT METAL SALT | SODIUM ACETATE | — | — | — | — |
| WATER-SOLUBLE LOW MOLECULAR WEIGHT ORGANIC COMPOUND (BP: 250° C. OR LESS) | ALKANEDIOL (BP: 210° C. OR LESS) | PG (bp 188° C.) | 15.0 | 15.0 | 15.0 | 15.0 |
| | | 1,3BG (bp 207° C.) | — | — | — | — |
| | ALKYLENE GLYCOL MONOETHER (BP: 210° C. OR LESS) | MB (bp 158° C.) | 5.0 | 5.0 | 5.0 | 5.0 |
| | | PM (bp 120° C.) | — | — | — | — |
| | | DPM (bp 190° C.) | — | — | — | — |
| | AMIDE | 2P (bp 245° C.) | — | — | — | — |
| | SULFUR-CONTAINING SOLVENT | DMSO (bp 188° C.) | — | — | — | — |
| | CYCLIC ETHER | EOXM (bp 220° C.) | — | — | — | — |
| | ALKANEDIOL (BP: 210° C. TO 250° C.) | 1,2HD (bp 224° C.) | 1.0 | 1.0 | 1.0 | 1.0 |
| WATER-SOLUBLE LOW MOLECULAR WEIGHT ORGANIC COMPOUND (BP: MORE THAN 250° C.) | AMIDE | CPL (bp 267° C.) | 2.0 | 2.0 | 2.0 | 2.0 |
| SURFACTANT | SILICONE BASE | BYK-349 | 3.0 | 0.5 | 0.5 | 0.5 |
| | ACETYLENE BASE | SURFYNOL DF110D | 0.1 | 0.1 | 0.1 | 0.1 |
| | PURE WATER | | BALANCE | BALANCE | BALANCE | BALANCE |
| | TOTAL | | 100 | 100 | 100 | 100 |
| TOTAL OF WATER-SOLUBLE LOW MOLECULAR WEIGHT ORGANIC COMPOUND HAVING STANDARD BOILING POINT OF 250° C. OR LESS | | | 21.0 | 21.0 | 21.0 | 21.0 |
| TOTAL OF AMIDE, SULFUR-CONTAINING SOLVENT, AND CYCLIC ETHER | | | 2.0 | 2.0 | 2.0 | 2.0 |
| pH | | | 6.8 | 7.6 | 5 | 4.8 |
| DIFFERENCE IN pH (TO INK) | | | −2.2 | −1.4 | −4 | −4.2 |
| EVALUATION | MEMBER RELIABILITY | | A | A | C | C |

| | | | TREATMENT LIQUID 29 | TREATMENT LIQUID 30 | TREATMENT LIQUID 31 |
|---|---|---|---|---|---|
| ORGANIC ACID | DICARBOXYLIC ACID | ADIPIC ACID (bp 338° C.) | 0.300 | 0.030 | 3.000 |
| | | SUCCINIC ACID (bp 235° C.) | — | — | — |
| | MONOCARBOXYLIC ACID | PROPIONIC ACID (bp 141° C.) | — | — | — |
| | HYDROXY ACID | LACTIC ACID (bp 217° C.) | — | — | — |
| | | CALCIUM FORMATE | — | — | — |
| ORGANIC ACID POLYVALENT METAL SALT | ORGANIC ACID DIVALENT METAL SALT | CALCIUM ACETATE | — | — | — |
| | | CALCIUM PROPIONATE | — | — | — |
| | | CALCIUM LACTATE | — | — | — |
| | | MAGNESIUM ACETATE | — | — | — |
| CATIONIC POLYMER | AMINE/EPICHLOROHYDRIN COPOLYMER | CATIONMASTER PD-7 (EFFECTIVE COMPONENT) | — | — | — |
| | POLYETHYLENEIMINE | Lupasol FG (EFFECTIVE COMPONENT) | — | — | — |
| OTHER METAL SALT | INORGANIC ACID DIVALENT METAL SALT | CALCIUM CHLORIDE | 3.0 | — | — |
| | ORGANIC ACID MONOVALENT METAL SALT | SODIUM ACETATE | — | 3.0 | — |
| WATER-SOLUBLE LOW MOLECULAR WEIGHT ORGANIC COMPOUND (BP: 250° C. OR LESS) | ALKANEDIOL (BP: 210° C. OR LESS) | PG (bp 188° C.) | 15.0 | 15.0 | 15.0 |
| | | 1,3BG (bp 207° C.) | — | — | — |
| | ALKYLENE GLYCOL MONOETHER (BP: 210° C. OR LESS) | MB (bp 158° C.) | 5.0 | 5.0 | 5.0 |
| | | PM (bp 120° C.) | — | — | — |
| | | DPM (bp 190° C.) | — | — | — |
| | AMIDE | 2P (bp 245° C.) | — | — | — |
| | SULFUR-CONTAINING SOLVENT | DMSO (bp 188° C.) | — | — | — |
| | CYCLIC ETHER | EOXM (bp 220° C.) | — | — | — |
| | ALKANEDIOL (BP: 210° C. TO 250° C.) | 1,2HD (bp 224° C.) | 1.0 | 1.0 | 1.0 |

TABLE 4-continued

| | | | | | |
|---|---|---|---|---|---|
| WATER-SOLUBLE LOW MOLECULAR WEIGHT ORGANIC COMPOUND (BP: MORE THAN 250° C.) | AMIDE | CPL (bp 267° C.) | 2.0 | 2.0 | 2.0 |
| SURFACTANT | SILICONE BASE | BYK-349 | 0.5 | 0.5 | 0.5 |
| | ACETYLENE BASE | SURFYNOL DF110D | 0.1 | 0.1 | 0.1 |
| | PURE WATER | | BALANCE | BALANCE | BALANCE |
| | TOTAL | | 100 | 100 | 100 |
| TOTAL OF WATER-SOLUBLE LOW MOLECULAR WEIGHT ORGANIC COMPOUND HAVING STANDARD BOILING POINT OF 250° C. OR LESS | | | 21.0 | 21.0 | 21.0 |
| TOTAL OF AMIDE, SULFUR-CONTAINING SOLVENT, AND CYCLIC ETHER | | | 2.0 | 2.0 | 2.0 |
| pH | | | 6.9 | 7.1 | 3 |
| DIFFERENCE IN pH (TO INK) | | | −2.1 | −1.9 | −6 |
| EVALUATION | | MEMBER RELIABILITY | A | A | C |

In Tables 1 to 4, "bp" represents the standard boiling point. In addition, in Tables 1 to 4, the substances not shown by the compound names are as shown below.

Catiomaster PD-7: amine/epichlorohydrin copolymer, manufactured by Yokkaichi Chemical Company Limited
Lupasol FG: polyethyleneimine, manufactured by BASF Japan Ltd.
PG: propylene glycol
1,3BG: 1,3-butylene glycol
MB: 3-methoxy-1-butanol
PM: propylene glycol-1-monomethyl ether
DPM: dipropylene glycol monomethyl ether
2P: 2-pyrrolidone
DMSO: dimethylsulfoxide
EOXM: 3-ethyl-3-oxetanemethanol
1,2HD: 1,2-hexanediol
CPL: ε-caprolactam
BYK-349: silicone-based surfactant, manufactured by BYK Japan KK
Surfynol DF110D: acetylene-based surfactant, manufactured by Nisshin Chemical Industry Co., Ltd.

3.2. Preparation of Ink Jet Ink Composition

After the components shown below were charged into a container and were then mixed and stirred together for 2 hours using a magnetic stirrer, filtration was performed using a membrane filter having a pore diameter of 5 m, so that an ink jet ink composition to be used for Examples and Comparative Examples was obtained. The pure water was added so that a total mass of the ink jet ink composition was 100 percent by mass.

PG: 15.0 percent by mass
1,2HD: 1.0 percent by mass
MB: 5.0 percent by mass
TIPA (triisopropanolamine): 1.0 percent by mass
CPL: 2.0 percent by mass
BYK-349: 0.5 percent by mass
Cyan pigment (effective component): 4.0 percent by mass
Joncryl 631 (effective component): 6.0 percent by mass
Hitech E-6500 (effective component): 0.5 percent by mass In addition, the trade name represents the compound shown below.

Joncryl 631: styrene-acrylic-based resin emulsion, manufactured by BASF Japan Ltd.
Hitech E-6500: polyethylene-based wax emulsion, manufactured by Toho Chemical Industry Co., Ltd.

In addition, a cyan pigment dispersion liquid was prepared as described below.

In a flask equipped with a dripping funnel, a nitrogen inlet tube, a reflux condenser, a thermometer, and a stirring device, 50 g of methyl ethyl ketone (MEK) was charged, and while nitrogen bubbling was performed, the temperature was increased to 75° C. In addition, a mixture of a monomer including 80 g of butyl methacrylate, 50 g of methyl methacrylate, 15 g of styrene, and 20 g of methacrylic acid; 50 g of MEK; and 500 mg of a polymerization initiator (azoisobutyronitrile/AIBN) was dripped into the flask described above over 3 hours.

After the dripping was finished, heating reflux was further performed for 6 hours, and MEK in an amount corresponding to that lost by evaporation was added after spontaneous cooling, so that a resin solution (resin solid content: 50 percent by mass, acid value: 79 mg/KOH, Tg: 65° C.) was obtained. After a predetermined amount of a sodium hydroxide aqueous solution at a concentration of 20 percent by mass was added as a neutralizer to 20 g of the above resin solution to neutralize 100% of a salt forming group, 50 g of a pigment (C.I. Pigment Blue 15: 3) was gradually added with stirring to the neutralized solution and was then kneaded for 2 hours by a bead mill.

After 200 g of ion exchange water was added to the kneaded product thus obtained and then stirred, MEK was distilled off by heating in a reduced-pressure atmosphere. Furthermore, the concentration was adjusted by ion exchange water, so that a pigment dispersion liquid (pigment solid content: 20 percent by mass, resin solid content: 5 percent by weight) was obtained.

3.3. Measurement of pH

The pH of each treatment liquid was measured using a pH meter (F-74, manufactured by HORIBA, Ltd.), and the results are shown in Tables 1 to 4. In addition, when the pH of the ink was measured using the same pH meter as described above, the result was 9.0. In Tables 1 to 4, the difference between the pH of each treatment liquid and the pH of the ink (pH of the treatment liquid-pH of the ink) is shown.

3.4. Recording Test

Recording conditions in an evaluation test were set as described below.
Recording Conditions
Printer: "SC-R5050", manufactured by Seiko Epson Corporation Resolution: 1,200×1,200 dpi
Ink adhesion amount: maximum 17 mg/inch$^2$ (duty: 100%)
Treatment liquid adhesion amount: 10.0 percent by mass with respect to ink adhesion amount.
Printing pattern: solid pattern (ink+treatment liquid)
Number of scannings: 9 times
Paper face temperature: 45° C.
Post-drying temperature: 70° C., post-heating was performed by a post-drying heater provided downstream in a recording medium transport direction.
Recording medium: "Orajet 3165G-010", trade name, vinyl chloride film, manufactured by Orafol Japan Ltd.
Platen gap: 1.7 mm The recording conditions described above will be additionally further described.

The paper face temperature indicates a surface temperature of the recording medium in a primary drying step. In addition, as a primary drying device, a platen heater was used. Furthermore, ventilation was performed in the vicinity of the surface of the recording medium by a fan provided at an upper side of an ink jet head. A wind temperature was set to 25° C. The number of scannings is the number of main scannings performed on the same main scanning region. The treatment liquid was filled in a nozzle line of the ink jet head of the above recording apparatus disposed upstream in the recording medium transport direction, and the ink solution was filled in a nozzle line disposed downstream in the recording medium transport direction. The recording was performed under the recording conditions described above.

3.5. Evaluation Method

In each of Examples and Comparative Examples, evaluation tests of the abrasion resistance, the image quality (wet spreadability), the clogging recovery property, and the storage stability were performed. Hereinafter, the evaluation methods will be described.

3.5.1. Evaluation of Member Reliability

First, an epoxy resin, EPIKOTE RESIN 828 (manufactured by HEXION), and a curing agent, VERSAMID 125 (manufactured by GABRIEL), were mixed together at an equal mass ratio and then cured, so that a cured epoxy resin was obtained.

After 0.4 g of an epoxy cured piece was fully immersed in the treatment liquid received in a container, and the container is sealed with a lid, the container was left for 14 days in an environment at 60° C. After the container was left, the epoxy cured piece was recovered, and the treatment liquid was sufficiently washed out, the weight was measured, and a swelling rate of the cured piece was calculated by the following equation.

Swelling rate (%)=(weight after immersion−weight before immersion)×100

The swelling rate of each treatment liquid thus prepared was measured and then evaluated in accordance with the following criteria, and the results are shown in Tables 1 to 4.
A: swelling rate of 30% or less
B: swelling rate of more than 30% to 40%
C: swelling rate of more than 40%

3.5.2. Abrasion Resistance

In each of Examples and Comparative Examples, by using the treatment liquid shown in Table 5 and the ink, a solid pattern (duty: 70%) was printed on the recording medium by an ink jet method and was then left at room temperature for 30 minutes. Subsequently, after a solid pattern printed portion was cut into a rectangular shape having 30×150 mm, the printed portion was wetted with water and then rubbed 100 times with a plain-woven cloth using a Gakushin-type fastness rubbing tester (load: 500 g), and a peeling degree of the ink was evaluated by visual inspection. The peeling degree was evaluated in accordance with the following evaluation criteria, and the results are shown in Tables 5-1 to 5-4.
AA: No peeling is observed.
A: Less than 20% of evaluation area is peeled off.
B: Less than 50% of evaluation area is peeled off.
C: 50% or more of evaluation area is peeled off.

3.5.3. Solid Image Quality

In each of Examples and Comparative Examples, by using the treatment liquid shown in Table 5 and the ink, a solid pattern (gradation pattern in duty increments of 10%) was printed on the recording medium by an ink jet method, and a printed matter was observed by visual inspection. The evaluation was performed in accordance with the following criteria, and the results are shown in Tables 5-1 to 5-4.
AA: uniformity of solid pattern is preferable.
A: irregularity is generated in intermediate portion (duty of 60%) and is visually recognized at a distance of 30 cm.
B: irregularity is generated in intermediate portion (duty of 60%) and is visually recognized at a distance of 1 m.
C: irregularity is also generated in a high duty portion (duty of 90%) and is visually recognized at a distance of 30 cm.

3.5.4. Odor

After 5 g of the treatment liquid was received in a petri dish and then heated at 45° C., the odor thereof was sensory evaluated, and the results obtained in accordance with the following criteria are shown in Tables 5-1 to 5-4.
A: Odor is not concerned.
B: Odor is concerned but is acceptable.
C: Odor is seriously concerned and unpleasant.

TABLE 5-1

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
|---|---|---|---|---|---|---|---|---|
| TREATMENT LIQUID No. | TREATMENT LIQUID 1 | TREATMENT LIQUID 2 | TREATMENT LIQUID 3 | TREATMENT LIQUID 4 | TREATMENT LIQUID 5 | TREATMENT LIQUID 6 | TREATMENT LIQUID 7 | TREATMENT LIQUID 8 |
| ABRASION RESISTANCE | A | A | B | A | A | B | A | A |
| SOLID IMAGE QUALITY | A | A | AA | A | A | A | A | A |
| ODOR | A | A | A | A | C | A | C | B |

TABLE 5-2

|  | EXAMPLE 9 | EXAMPLE 10 | EXAMPLE 11 | EXAMPLE 12 | EXAMPLE 13 | EXAMPLE 14 | EXAMPLE 15 | EXAMPLE 16 |
|---|---|---|---|---|---|---|---|---|
| TREATMENT LIQUID No. | TREATMENT LIQUID 9 | TREATMENT LIQUID 10 | TREATMENT LIQUID 11 | TREATMENT LIQUID 12 | TREATMENT LIQUID 13 | TREATMENT LIQUID 14 | TREATMENT LIQUID 15 | TREATMENT LIQUID 16 |
| ABRASION RESISTANCE | A | A | A | B | B | AA | B | A |
| SOLID IMAGE QUALITY | A | B | A | A | A | A | B | AA |
| ODOR | A | C | A | A | A | A | A | A |

TABLE 5-3

|  | EXAMPLE 17 | EXAMPLE 18 | EXAMPLE 19 | EXAMPLE 20 | EXAMPLE 21 | EXAMPLE 22 | EXAMPLE 23 | EXAMPLE 24 |
|---|---|---|---|---|---|---|---|---|
| TREATMENT LIQUID No. | TREATMENT LIQUID 17 | TREATMENT LIQUID 18 | TREATMENT LIQUID 19 | TREATMENT LIQUID 20 | TREATMENT LIQUID 21 | TREATMENT LIQUID 22 | TREATMENT LIQUID 23 | TREATMENT LIQUID 24 |
| ABRASION RESISTANCE | B | A | B | A | B | B | B | B |
| SOLID IMAGE QUALITY | A | A | A | A | A | A | A | A |
| ODOR | A | A | A | A | A | A | A | A |

TABLE 5-4

|  | EXAMPLE 25 | COMPARATIVE EXAMPLE 1 | COMPARATIVE EXAMPLE 2 | COMPARATIVE EXAMPLE 3 | COMPARATIVE EXAMPLE 4 | COMPARATIVE EXAMPLE 5 | COMPARATIVE EXAMPLE 6 |
|---|---|---|---|---|---|---|---|
| TREATMENT LIQUID No. | TREATMENT LIQUID 25 | TREATMENT LIQUID 26 | TREATMENT LIQUID 27 | TREATMENT LIQUID 28 | TREATMENT LIQUID 29 | TREATMENT LIQUID 30 | TREATMENT LIQUID 31 |
| ABRASION RESISTANCE | B | A | B | AA | C | C | C |
| SOLID IMAGE QUALITY | AA | C | AA | C | A | C | C |
| ODOR | A | A | A | A | A | C | A |

3.6. Evaluation Results

It was found that by the treatment liquid of each Example which contains the organic acid and the at least one selected from an organic acid polyvalent metal salt and a cationic polymer and in which the content of the at least one selected from an organic acid polyvalent metal salt and a cationic polymer is 1 to 15 percent by mass with respect to the total mass of the treatment liquid, and the pH of the treatment liquid is 5.5 or more, the abrasion resistance and the image quality of the image are made excellent. On the other hand, by each Comparative Example which was different from Example, the abrasion resistance of the image, the image quality, and/or the member reliability was inferior.

The embodiments and the modified examples are each one example, and the present disclosure is not limited thereto. For example, the embodiments and the modified examples may be appropriately used in combination.

The present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

From the embodiments and the modified examples described above, the following conclusions are obtained.

A treatment liquid is a water-based treatment liquid and is used for a recording method of adhering a water-based ink jet ink composition containing a colorant and the treatment liquid to a recording medium. The treatment liquid contains: an organic acid and at least one selected from an organic acid polyvalent metal salt and a cationic polymer, a content of the at least one selected from an organic acid polyvalent metal salt and a cationic polymer is 1 to 15 percent by mass with respect to a total mass of the treatment liquid, and the treatment liquid has a pH of 5.5 or more.

According to this treatment liquid, since the organic acid and the at least one selected from an organic acid polyvalent metal salt and a cationic polymer are contained, the aggregation ability of the component of the water-based ink jet ink composition containing a colorant is preferable, and drying property thereof is also preferable. Accordingly, the abrasion resistance and the image quality of the image formed by the ink jet ink composition can be made preferable. In addition, according to this treatment liquid, since the pH is not excessively low, the member reliability can also be secured.

In the treatment liquid described above, the pH of the treatment liquid may be lower than a pH of the ink jet ink composition by 1.5 or more.

According to this treatment liquid, the aggregation ability of the component of the water-based ink jet ink composition containing a colorant is made more preferable, and an image having a more preferable image quality can be obtained.

In the treatment liquid described above, when the organic acid is a divalent organic acid, and the organic acid polyvalent metal salt is contained, the organic acid polyvalent metal salt may be a salt composed of a monovalent organic acid and a polyvalent metal.

According to this treatment liquid, the drying property is made more preferable, and the abrasion resistance of the image can be made more preferable.

In the treatment liquid described above, a content of the organic acid may be 2.5 percent by mass or less.

According to this treatment liquid, the degradation of the member of the container and the recording medium is likely to be suppressed.

In the treatment liquid described above, the pH may be 5.5 to 7.5.

According to this treatment liquid, the degradation of the member of the container and the recording medium is likely to be suppressed.

In the treatment liquid described above, a water-soluble low molecular weight organic compound may be further contained.

According to this treatment liquid, the drying property of the image can be made more preferable.

In the treatment liquid described above, as the water-soluble low molecular weight organic compound, an alkanediol having a standard boiling point of 210° C. or less and an alkylene glycol monoether represented by the following general formula (1) having a standard boiling point of 210° C. or less may be contained.

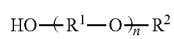

(1)

In the formula (1), $R^1$ represents a hydrocarbon group having 2 to 5 carbon atoms, $R^2$ represents a hydrocarbon group having 1 to 2 carbon atoms, and n represents 1 or 2.

According to this treatment liquid, the drying property of the image can be made more preferable.

In the treatment liquid described above, as the water-soluble low molecular weight organic compound, a compound having a standard boiling point of 250° C. or less may be contained at a content of 30 percent by mass or less.

According to this treatment liquid, the drying property of the image can be made more preferable.

In the treatment liquid described above, the water-soluble low molecular weight organic compound may include at least one selected from an amide, a sulfur-containing solvent, and a cyclic ether each of which has a standard boiling point of 150° C. to 300° C.

According to this treatment liquid, the drying property of the image can be made more preferable.

The treatment liquid described above may be used for recording on a non-absorbing recording medium or a low-absorbing recording medium.

According to this treatment liquid, an effect in which the abrasion resistance and the image quality of the image formed by the ink jet ink composition are made preferable can be more significantly obtained.

In the treatment liquid described above, a silicone-based surfactant may be further contained at a content of 0.1 to 4 percent by mass with respect to the total mass of the treatment liquid.

According to this treatment liquid, the permeability thereof in the recording medium is made more preferable, and a more excellent image can be obtained.

A recording method includes a treatment liquid adhesion step of adhering the treatment liquid described above to the recording medium and an ink adhesion step of adhering the ink jet ink composition to the recording medium by an ink jet method.

According to this recording method, since the treatment liquid containing the organic acid and the at least one selected from an organic acid polyvalent metal salt and a cationic polymer is used, the aggregation ability is made preferable, and the drying property is also made preferable, so that the image quality and the abrasion resistance of the image formed by the water-based ink jet ink composition containing a colorant can be made preferable.

What is claimed is:

1. A treatment liquid which is a water-based treatment liquid and which is used for a recording method of adhering a water-based ink jet ink composition containing a colorant and the treatment liquid to a recording medium, the treatment liquid containing:
   an organic acid; and
   at least one selected from an organic acid polyvalent metal salt and a cationic polymer,
   wherein a content of the organic acid is 5.0 percent by mass or less with respect to a total mass of the treatment liquid,
   a content of the at least one selected from an organic acid polyvalent metal salt and a cationic polymer is 1 to 15 percent by mass with respect to the total mass of the treatment liquid, and
   the treatment liquid has a pH of 5.5 or more.

2. The treatment liquid according to claim 1, wherein the pH of the treatment liquid is lower than a pH of the ink jet ink composition by 1.5 or more.

3. The treatment liquid according to claim 1, wherein the organic acid is a divalent organic acid, and when the organic acid polyvalent metal salt is contained, the organic acid polyvalent metal salt is a salt composed of a monovalent organic acid and a polyvalent metal.

4. The treatment liquid according to claim 1, wherein a content of the organic acid is 2.5 percent by mass or less.

5. The treatment liquid according to claim 1, wherein the pH of the treatment liquid is 5.5 to 7.5.

6. The treatment liquid according to claim 1, further containing a water-soluble low molecular weight organic compound.

7. The treatment liquid according to claim 6, wherein as the water-soluble low molecular weight organic compound, an alkanediol having a standard boiling point of 210° C. or less and an alkylene glycol monoether represented by the following general formula (1) having a standard boiling point of 210° C. or less are contained,

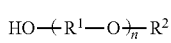 (1)

where in the formula (1), $R^1$ represents a hydrocarbon group having 2 to 5 carbon atoms, $R^2$ represents a hydrocarbon group having 1 to 2 carbon atoms, and n represents 1 or 2.

8. The treatment liquid according to claim 6, wherein as the water-soluble low molecular weight organic compound, a compound having a standard boiling point of 250° C. or less is contained at a content of 30 percent by mass or less.

9. The treatment liquid according to claim 6, wherein the water-soluble low molecular weight organic compound includes at least one selected from an amide, a sulfur-containing solvent, and a cyclic ether each of which has a standard boiling point of 150° C. to 300° C.

10. The treatment liquid according to claim 1, wherein the treatment liquid is used for recording on a non-absorbing recording medium or a low-absorbing recording medium.

11. The treatment liquid according to claim 1, further containing a silicone-based surfactant at a content of 0.1 to 4 percent by mass with respect to the total mass of the treatment liquid.

12. The treatment liquid according to claim 1, wherein the treatment liquid has a pH of 6.0 or more.

13. The treatment liquid according to claim 1, wherein the treatment liquid contains the organic acid polyvalent metal salt, and a content of the organic acid polyvalent metal salt is 1 to 10 percent by mass with respect to the total mass of the treatment liquid.

14. A recording method comprising:
a treatment liquid adhesion step of adhering the treatment liquid according to claim 1 to the recording medium; and
an ink adhesion step of adhering the ink jet ink composition to the recording medium by an ink jet method.

* * * * *